United States Patent
Park et al.

(10) Patent No.: US 12,119,889 B2
(45) Date of Patent: Oct. 15, 2024

(54) CALIBRATION CIRCUIT FOR CALIBRATING PHASES AND GAINS BETWEEN CHANNELS IN MULTI-CHANNEL BEAMFORMING SYSTEM, MULTI-CHANNEL BEAMFORMING SYSTEM INCLUDING THE SAME AND CHANNEL CALIBRATION METHOD USING THE SAME

(71) Applicant: Korea Advanced Institute of Science and Technology, Daejeon (KR)

(72) Inventors: Jinseok Park, Daejeon (KR); Song-Cheol Hong, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 148 days.

(21) Appl. No.: 17/919,623

(22) PCT Filed: Jun. 26, 2020

(86) PCT No.: PCT/KR2020/008317
§ 371 (c)(1),
(2) Date: Oct. 18, 2022

(87) PCT Pub. No.: WO2021/230419
PCT Pub. Date: Nov. 18, 2021

(65) Prior Publication Data
US 2023/0361888 A1    Nov. 9, 2023

(30) Foreign Application Priority Data
May 15, 2020  (KR) .................. 10-2020-0058439

(51) Int. Cl.
H04B 17/13     (2015.01)
H04B 17/12     (2015.01)
(Continued)

(52) U.S. Cl.
CPC ............. *H04B 17/13* (2015.01); *H04B 17/12* (2015.01); *H04B 17/191* (2023.05); *H04B 17/221* (2023.05)

(58) Field of Classification Search
CPC .................................... H04B 17/13
See application file for complete search history.

(56) References Cited

U.S. PATENT DOCUMENTS 3,210,656 A  *  10/1965  Worthington ........... H04M 3/28
                                              324/612
4,864,140 A  *   9/1989  Rogers .................. G01T 1/2985
                                              250/369
(Continued)

FOREIGN PATENT DOCUMENTS

EP      2 722 928 A1    4/2014
JP      2018-100839 A   6/2018
(Continued)

OTHER PUBLICATIONS

International Search Report dated Feb. 5, 2021 for International Application No. PCT/KR2020/008317; 5 Pages.
Extended European Search Report (EESR) dated Oct. 5, 2023 for European Application No. 20934955.4; 8 Pages.

*Primary Examiner* — Hsinchun Liao
(74) *Attorney, Agent, or Firm* — DALY, CROWLEY, MOFFORD & DURKEE, LLP

(57) ABSTRACT

A calibration circuit includes a selection unit, a power detector, an analog-to-digital converter and a calibrator. The selection unit is connected to the plurality of channels, selects two channels from among the plurality of channels, provides a test signal to the selected two channels, and receives a test result signal from the selected two channels. The power detector detects power of the selected two channels. The analog-to-digital converter performs an A/D conversion on an output of the power detector. The calibrator calibrates the phases and the gains between the plurality (Continued)

of channels based on an output of the analog-to-digital converter. One of the plurality of channels is set as a reference channel, phases and gains of remaining channels other than the reference channel among the plurality of channels are sequentially optimized based on the reference channel, and a phase and a gain of the reference channel is optimized.

18 Claims, 25 Drawing Sheets

(51) Int. Cl.
  *H04B 17/15* (2015.01)
  *H04B 17/21* (2015.01)

(56) References Cited

U.S. PATENT DOCUMENTS

| | | | | |
|---|---|---|---|---|
| 5,245,425 A | * | 9/1993 | Klatt | H04N 5/33 |
| | | | | 250/252.1 |
| 5,543,801 A | * | 8/1996 | Shawyer | H01Q 3/267 |
| | | | | 342/372 |
| 2012/0146840 A1 | | 6/2012 | Ookawa | |

FOREIGN PATENT DOCUMENTS

| | | |
|---|---|---|
| KR | 2014-0098690 A | 8/2014 |
| KR | 2015-0105235 A | 9/2015 |
| KR | 2019-0021688 A | 3/2019 |
| KR | 2019-0049556 A | 5/2019 |
| KR | 2019-0113997 A | 10/2019 |
| KR | 10-2061620 B1 | 1/2020 |

\* cited by examiner

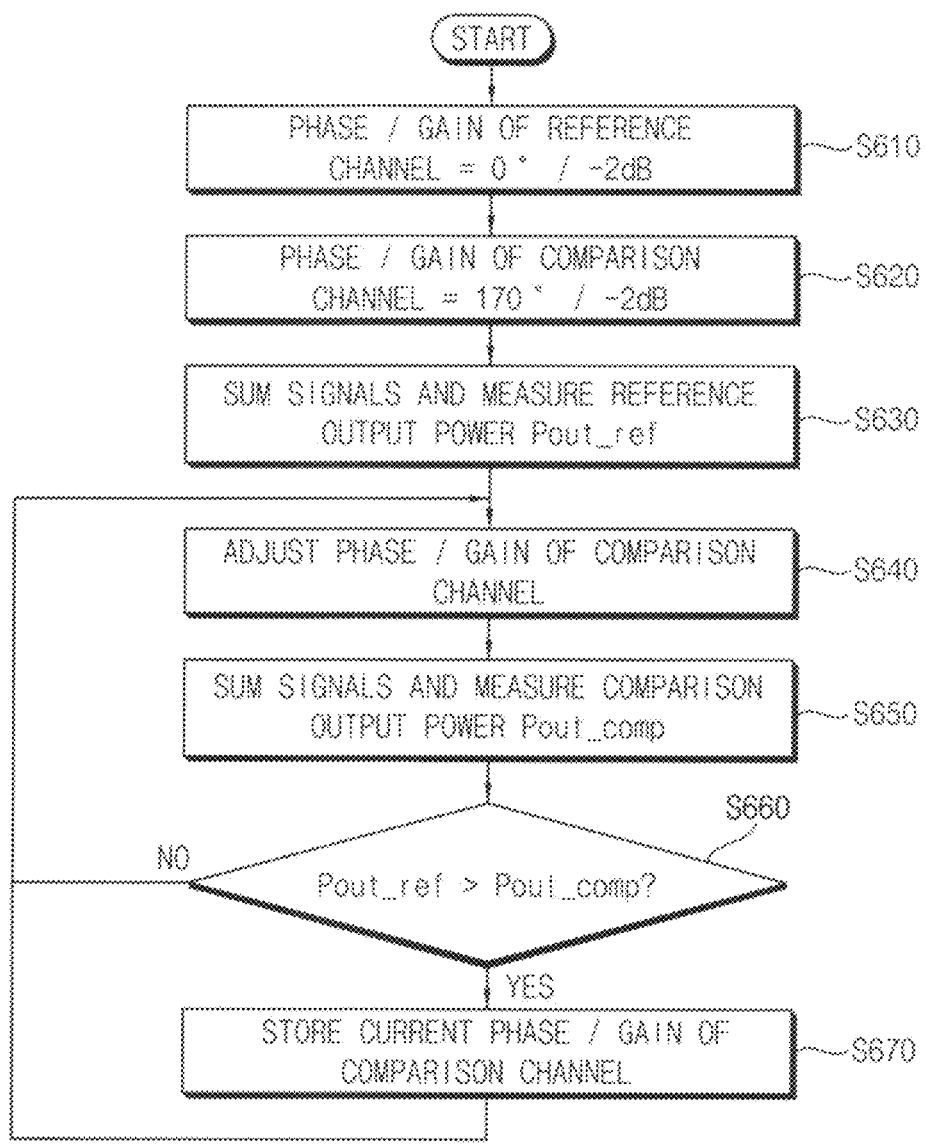

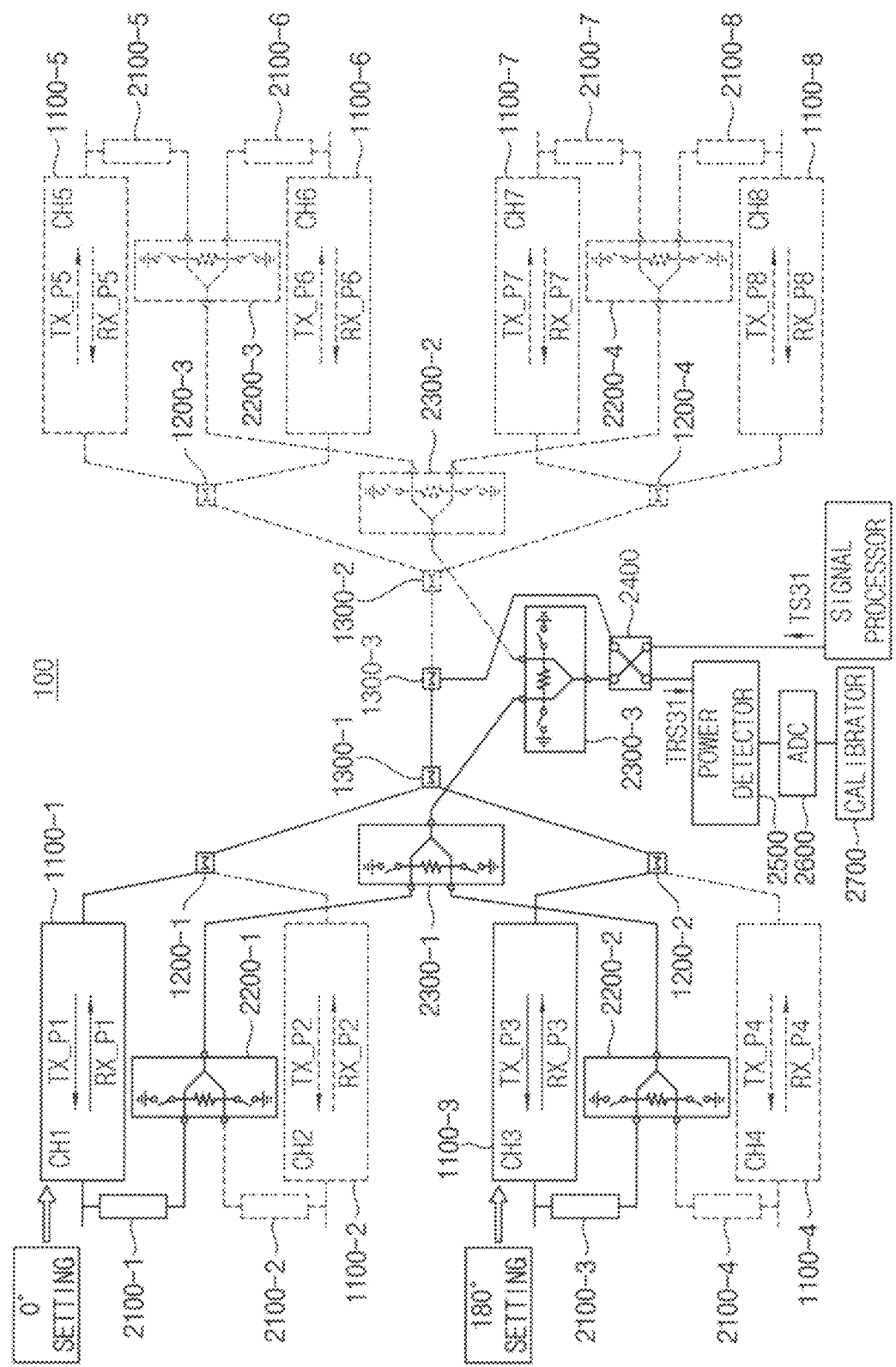

CALIBRATION CIRCUIT FOR CALIBRATING PHASES AND GAINS BETWEEN CHANNELS IN MULTI-CHANNEL BEAMFORMING SYSTEM, MULTI-CHANNEL BEAMFORMING SYSTEM INCLUDING THE SAME AND CHANNEL CALIBRATION METHOD USING THE SAME

CROSS REFERENCE TO RELATED APPLICATION

This present application is a national stage filing under 35 U.S.C § 371 of PCT Application No. PCT/KR2020/008317 filed on Jun. 26, 2020 which is based upon and claims the benefit of priority to Korean Patent Application No. 10-2020-0058439, filed on May 15, 2020 in the Korean Intellectual Property Office (KIPO). The disclosures of the above-listed applications are hereby incorporated by reference herein their entirety.

BACKGROUND

1. Technical Field

Example embodiments relate generally to signal processing techniques, and more particularly to calibration circuits for calibrating phases and gains between channels in multi-channel beamforming systems, multi-channel beamforming systems including the calibration circuits, and channel calibration methods using the calibration circuits.

2. Description of the Related Art

A fifth generation (5G) mobile communication system, which is currently being studied, requires a network capacity of about several tens to several hundreds times as compared with a long-term evolution (LTE), which is a fourth generation (4G) mobile communication system. In addition, a communication technology based on millimeter wave communication is being studied to ensure wide bandwidth. In the millimeter wave band, a transmission/reception signal is weaker than a frequency band of a conventional 4G mobile communication system, and thus a technique such as beamforming may be used to overcome this problem.

A phase array antenna is a technology for increasing beam directivity and gain by arranging antennas in an array form and by combining beams received through the antennas. Since signals can be transmitted only in a desired direction by beamforming, a large gain may be obtained. A high data transmission rate should be required in the 5G mobile communication system, and thus the phase array antenna may be used as a key technology for calibrating a large loss on path.

The 5G mobile communication system with the millimeter wave band may use a relatively high frequency, so there is an advantage that the sizes of the antennas and modules are reduced due to the short wavelength. However, such a short wavelength has a problem that phase and amplitude errors easily occur.

If the phase and amplitude errors occur on a signal from each antenna (or channel), the direction of the combined beam may vary, the sidelobe level may be increased, and the transmission speed may be reduced. Thus, a method of accurately measuring the signal from each channel and calibrating the signal with the appropriate phase/gain should be required.

SUMMARY

Some example embodiments provide a calibration circuit in a multi-channel beamforming system capable of efficiently calibrating phases and gains between channels using a sequential channel signal comparing scheme.

Some example embodiments provide a multi-channel beamforming system including the calibration circuit and capable of efficiently calibrating phases and gains between channels using the sequential channel signal comparing scheme.

Some example embodiments provide a channel calibration method using the calibration circuit in the multi-channel beamforming system and capable of efficiently calibrating phases and gains between channels using the sequential channel signal comparing scheme.

According to example embodiments, a calibration circuit is included in a multi-channel beamforming system including a plurality of channels, and calibrates phases and gains between the plurality of channels. The calibration circuit includes a selection unit, a power detector, an analog-to-digital converter and a calibrator. The selection unit is connected to the plurality of channels, selects two channels from among the plurality of channels, provides a test signal to the selected two channels, and receives a test result signal from the selected two channels. The power detector detects power of the selected two channels based on the test result signal. The analog-to-digital converter performs an analog-to-digital conversion on an output of the power detector. The calibrator calibrates the phases and the gains between the plurality of channels based on an output of the analog-to-digital converter. One of the plurality of channels is set as a reference channel, phases and gains of remaining channels other than the reference channel among the plurality of channels are sequentially optimized based on the reference channel, and a phase and a gain of the reference channel is optimized based on one of the remaining channels.

In some example embodiments, the plurality of channels may include a first channel to an N-th channel, where N is a natural number greater than or equal to three. The first channel may be selected as the reference channel, a second channel to the N-th channel may be sequentially selected as a comparison channel, and the second channel to the N-th channel may be sequentially set to have lowest power at a first phase. From among the second channel to the N-th channel, the second channel may be selected as the reference channel and a third channel may be selected as the comparison channel, and the third channel may be set to have lowest power at a second phase different from the first phase. The third channel may be selected as the reference channel, the first channel may be selected as the comparison channel, and the first channel may be set to have lowest power at the first phase.

In some example embodiments, in setting the second channel to have the lowest power at the first phase, while a phase and a gain of the first channel are set to the second phase and a first gain and a phase and a gain of the second channel are set to a third phase and the first gain, reference output power may be measured based on the test result signal obtained from the first and second channels. After the phase and the gain of the second channel are adjusted while the phase and the gain of the first channel are maintained, comparison output power may be measured based on the test result signal obtained from the first and second channels. Based on a result of comparing the reference output power with the comparison output power, the phase and the gain of the second channel may be set to have smallest phase error and smallest gain error.

In some example embodiments, in setting the third channel to have the lowest power at the second phase, while a phase and a gain of the second channel are set to the first phase and a first gain and a phase and a gain of the third channel are set to a third phase and the first gain, reference output power may be measured based on the test result signal obtained from the second and third channels. After the phase and the gain of the third channel are adjusted while the phase and the gain of the second channel are maintained, comparison output power may be measured based on the test result signal obtained from the second and third channels. Based on a result of comparing the reference output power with the comparison output power, the phase and the gain of the third channel may be set to have smallest phase error and smallest gain error.

In some example embodiments, the plurality of channels may include a first channel to an N-th channel, where N is a natural number greater than or equal to three. The first channel may be selected as the reference channel, an (N/2+1)-th channel to the N-th channel may be sequentially selected as a comparison channel, and the (N/2+1)-th channel to the N-th channel may be sequentially set to have lowest power at a first phase. The (N/2+1)-th channel may be selected as the reference channel, the first channel to an N/2-th channels may be sequentially selected as the comparison channel, and the first channel to the N/2-th channel may be sequentially set to have lowest power at the first phase.

In some example embodiments, the plurality of channels may include a first channel to an N-th channel, where N is a natural number greater than or equal to three. The first channel may be selected as the reference channel, an (N/2+1)-th channel to the N-th channel may be sequentially selected as a comparison channel, and the (N/2+1)-th channel to the N-th channel may be sequentially set to have lowest power at a first phase. The (N/2+1)-th channel may be selected as the reference channel, the first channel to an N/2-th channels may be sequentially selected as the comparison channel, and the first channel to the N/2-th channel may be sequentially set to have lowest power at a second phase different from the first phase.

In some example embodiments, each of the plurality of channels may include a transmission path and a reception path. The transmission path may be enabled in a transmission mode to output a transmission signal. The reception path may be enabled in a reception mode to receive a reception signal.

In some example embodiments, the selection unit may include a plurality of power couplers, a plurality of first channel selection structures, at least one second channel selection structure and a transceiving channel selector. The plurality of power couplers may be connected to the plurality of channels. The plurality of first channel selection structures may be connected to the plurality of power couplers. The second channel selection structure may be connected to the plurality of first channel selection structures. The transceiving channel selector may be connected to the second channel selection structure.

In some example embodiments, in the transmission mode, the test signal may be the transmission signal, the transceiving channel selector may provide the transmission signal to the selected two channels, and the transceiving channel selector may receive the test result signal from the selected two channels through the power couplers, the first channel selection structures and the second channel selection structure.

In some example embodiments, in the reception mode, the test signal may be the reception signal, the transceiving channel selector may provide the reception signal to the selected two channels through the second channel select structure, the first channel select structures and the power couplers, and the transceiving channel selector may receive the test result signal from the selected two channels.

In some example embodiments, the selection unit may include a plurality of quarter-wavelength transformers, a plurality of switches, a plurality of half-wavelength transformers, a combiner/divider and a transceiving channel selector. The plurality of quarter-wavelength transformers may be connected to the plurality of channels. The plurality of switches may be connected to the plurality of quarter-wavelength transformers. The plurality of half-wavelength transformers may be connected to the plurality of quarter-wavelength transformers. The combiner/divider may be connected to the plurality of half-wavelength transformers. The transceiving channel selector may be connected to the combiner/divider.

In some example embodiments, each of the plurality of channels may include only a transmission path that is enabled in a transmission mode to output a transmission signal.

In some example embodiments, the selection unit may include a plurality of power couplers, a plurality of first channel selectors, at least one second channel selector and a combiner/divider. The plurality of power couplers may be connected to the plurality of channels. The plurality of first channel selectors may be connected to the plurality of power couplers. The second channel selector may be connected to the plurality of first channel selectors. The combiner/divider may be connected to the second channel selector.

According to example embodiments, a multi-channel beamforming system includes a plurality of channels and a calibration circuit connected to the plurality of channels. The calibration circuit calibrates phases and gains between the plurality of channels. The calibration circuit includes a selection unit, a power detector, an analog-to-digital converter and a calibrator. The selection unit is connected to the plurality of channels, selects two channels from among the plurality of channels, provides a test signal to the selected two channels, and receives a test result signal from the selected two channels. The power detector detects power of the selected two channels based on the test result signal. The analog-to-digital converter performs an analog-to-digital conversion on an output of the power detector. The calibrator calibrates the phases and the gains between the plurality of channels based on an output of the analog-to-digital converter. One of the plurality of channels is set as a reference channel, phases and gains of remaining channels other than the reference channel among the plurality of channels are sequentially optimized based on the reference channel, and a phase and a gain of the reference channel is optimized based on one of the remaining channels.

According to example embodiments, in a channel calibration method for calibrating phases and gains between a plurality of channels included in a multi-channel beamforming system, the plurality of channels include a first channel to an N-th channel, where N is a natural number greater than or equal to three. The first channel is selected as a reference channel. A second channel to the N-th channel are sequentially selected as a comparison channel. The second channel to the N-th channel are sequentially set to have lowest power at a first phase. The second channel is selected as the reference channel. A third channel is selected as the comparison channel. The third channel is set to have lowest power at a second phase different from the first phase. The third channel is selected as the reference channel. The first channel is selected as the comparison channel. The first channel is set to have lowest power at the first phase.

In some example embodiments, in sequentially setting the second channel to the N-th channel to have the lowest power at the first phase, a phase and a gain of the first channel may be set to the second phase and a first gain. A phase and a gain of the second channel may be set to a third phase and the first gain. Reference output power may be measured based on a test result signal obtained from the first and second channels. The phase and the gain of the second channel may be adjusted while the phase and the gain of the first channel are maintained. Comparison output power may be measured based on the test result signal obtained from the first and second channels. Based on a result of comparing the reference output power with the comparison output power, the phase and the gain of the second channel may be set to have smallest phase error and smallest gain error.

In some example embodiments, in setting the third channel to have the lowest power at the second phase, a phase and a gain of the second channel may be set to the first phase and a first gain. A phase and a gain of the third channel may be set to a third phase and the first gain. Reference output power may be measured based on a test result signal obtained from the second and third channels. The phase and the gain of the third channel may be adjusted while the phase and the gain of the second channel are maintained. Comparison output power may be measured based on the test result signal obtained from the second and third channels. Based on a result of comparing the reference output power with the comparison output power, the phase and the gain of the third channel may be set to have smallest phase error and smallest gain error.

According to example embodiments, in a channel calibration method for calibrating phases and gains between a plurality of channels included in a multi-channel beamforming system, the plurality of channels include a first channel to an N-th channel, where N is a natural number greater than or equal to three. The first channel is selected as a reference channel. An (N/2+1)-th channel to the N-th channel are sequentially selected as a comparison channel. The (N/2+1)-th channel to the N-th channel are sequentially set to have lowest power at a first phase. The (N/2+1)-th channel is selected as the reference channel. The first channel to an N/2-th channel are sequentially selected as the comparison channel. The first channel to the N/2-th channel are sequentially set to have lowest power at the first phase or at a second phase different from the first phase.

In the calibration circuit, the multi-channel beamforming system and the channel calibration method according to example embodiments, the phases and the gains of the plurality of channels may be calibrated based on the multi-channel signal comparison scheme, and the envelope detector may be used for comparing the feedback signals, rather than using a local oscillator (LO) and in-phase/quadrature phase (I/Q) mixers. The difference in phase and gain between two channels may be detected by fixing the phase and gain of one channel, by adjusting the phase and gain of another channel, and by measuring the envelope of the summed signal from the two channels, and the channel may be calibrated by using or feeding back the difference. Accordingly, it may be less sensitive to frequency, and there may be no LO problems and direct current (DC) offset problems because the I/Q mixers are not used. In addition, both the transmission and reception paths may be easily calibrated by changing only the direction of the switches.

BRIEF DESCRIPTION OF THE DRAWINGS

FIG. 6 is a flowchart illustrating an example of step S250 in FIG. 3.

FIGS. 7A, 7B, 7C and 7D are diagrams for describing an operation of FIG. 3.

DETAILED DESCRIPTION OF THE EMBODIMENTS

Figure 1:
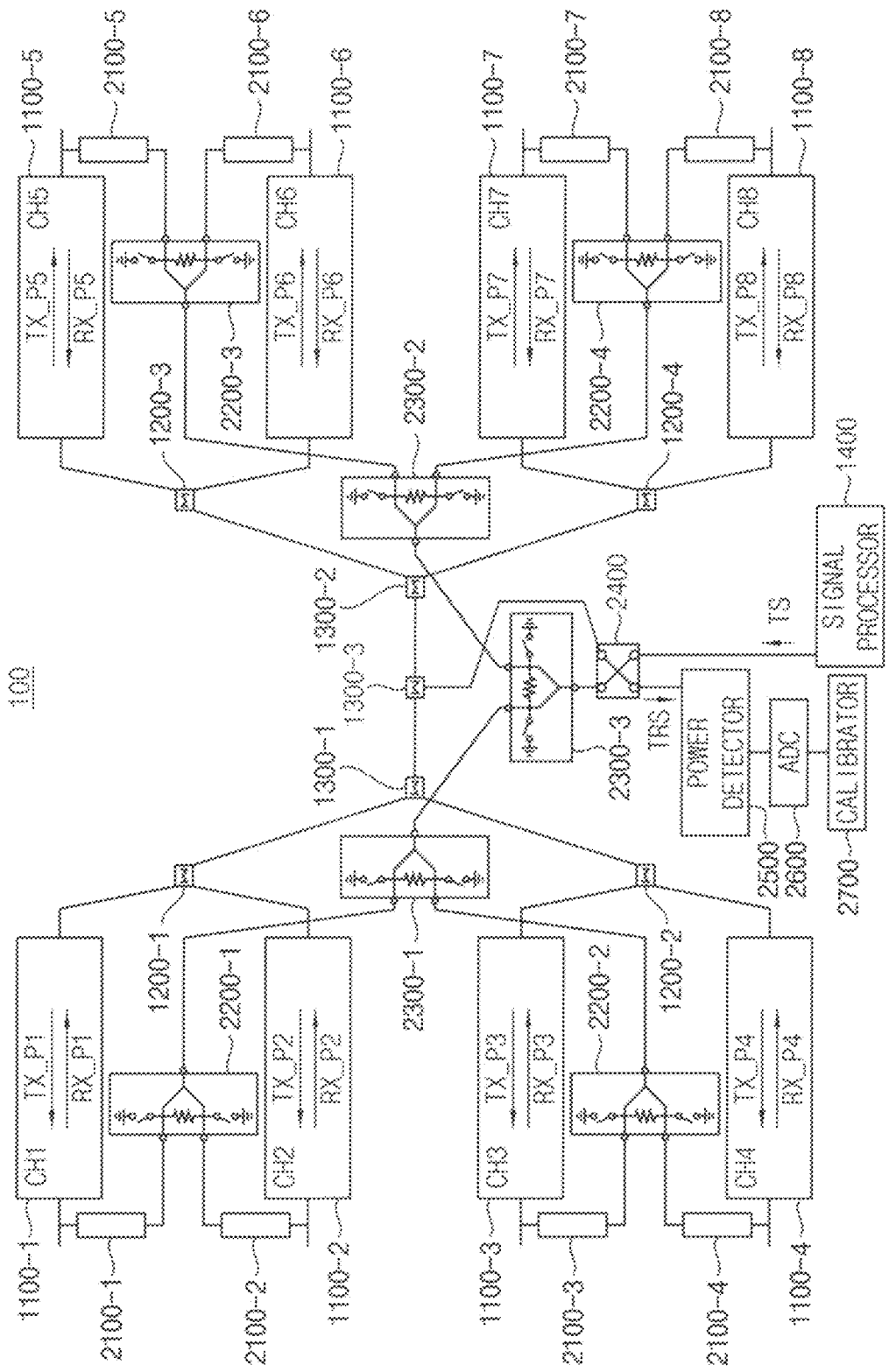
FIG. 1 is a block diagram illustrating a calibration circuit and a multi-channel beamforming system including the calibration circuit according to example embodiments.

Various example embodiments will be described more fully with reference to the accompanying drawings, in which embodiments are shown. This inventive concept may, however, be embodied in many different forms and should not be construed as limited to the embodiments set forth herein.

Rather, these embodiments are provided so that this disclosure will be thorough and complete, and will fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above and other features of the inventive concept will become more apparent by describing in detail example embodiments thereof with reference to the accompanying drawings. The same reference numerals are used for the same elements in the drawings and redundant explanations for the same elements are omitted.

FIG. 1 is a block diagram illustrating a calibration circuit and a multi-channel beamforming system including the calibration circuit according to example embodiments.

Referring to FIG. 1, a multi-channel beamforming system 100 includes a plurality of channels 1100-1, 1100-2, 1100-3, 1100-4, 1100-5, 1100-6, 1100-7 and 1100-8, and a calibration circuit. The multi-channel beamforming system 100 may further include a plurality of combiners/dividers 1200-1, 1200-2, 1200-3, 1200-4, 1300-1, 1300-2 and 1300-3, and a signal processor 1400.

The plurality of channels 1100-1 to 1100-8 output a transmission signal to be transmitted to the outside (e.g., an external device and/or system) in a transmission mode, and receive a reception signal from the outside in a reception mode. The plurality of channels 1100-1 to 1100-8 include a first channel to an N-th channel, where N is a natural number greater than or equal to three. For example, N may be an integer that is a multiple of two, and FIG. 1 illustrates a case where N=8. However, example embodiments are not limited thereto, and the number of channels may be variously determined according to example embodiments.

The plurality of channels 1100-1 to 1100-8 may include a plurality of transmission paths TX_P1, TX_P2, TX_P3, TX_P4, TX_P5, TX_P6, TX_P7 and TX_P8 that are enabled or activated in the transmission mode to output the transmission signal, and a plurality of reception paths RX_P1, RX_P2, RX_P3, RX_P4, RX_P5, RX_P6, RX_P7 and RX_P8 that are enabled or activated in the reception mode to receive the reception signal. One channel may include one transmission path and one reception path. For example, the first channel 1100-1 may include the transmission path TX_P1 and the reception path RX_P1. A configuration of each channel will be described with reference to FIG. 2.

The plurality of combiners/dividers 1200-1 to 1200-4 and 1300-1 to 1300-3 may operate as dividers for dividing or distributing the transmission signal in the transmission mode, and may operate as combiners for combining or synthesizing the reception signal in the reception mode.

Each of the combiners/dividers 1200-1 to 1200-4 may be connected to two adjacent channels. For example, the combiner/divider 1200-1 may be directly connected to the first and second channels 1100-1 and 1100-2, may divide a signal provided to the first and second channels 1100-1 and 1100-2 in the transmission mode, and may combine signals received from the first and second channels 1100-1 and 1100-2 in the reception mode.

Each of the combiners/dividers 1300-1 to 1300-3 may be connected to two adjacent combiners/dividers. For example, the combiner/divider 1300-1 may be directly connected to the combiners/dividers 1200-1 and 1200-2, may divide a signal provided to the first to fourth channels 1100-1 to 1100-4 in the transmission mode, and may combine signals received from the first to fourth channels 1100-1 to 1100-4 in the reception mode.

The signal processor 1400 may perform signal processing in the transmission mode to generate the transmission signal, and may perform signal processing on the reception signal in the reception mode. For example, the signal processing may include operations such as encoding/decoding, encryption/decryption and/or modulation/demodulation, and may include signal processing for baseband signals, signal processing for intermediate frequency signals, and signal processing for radio frequency (RF) signals. In other words, the signal processor 1400 may perform both digital signal processing and subsequent RF signal processing, and the signal processor 1400 may be referred to as a signal processing and RF up-down converter (or RF transceiver). In addition, the signal processor 1400 may generate a test signal TS that is used to calibrate phases and gains between channels according to example embodiments.

The calibration circuit calibrates or compensates phases and gains between channels. The calibration circuit includes a selection unit, a power detector 2500, an analog-to-digital converter (ADC) 2600 and a calibrator 2700.

The selection unit is connected to the plurality of channels 1100-1 to 1100-8. The selection unit selects two channels from among the plurality of channels 1100-1 to 1100-8, provides the test signal TS to the selected two channels, and receives a test result signal TRS from the selected two channels.

The selection unit may include a plurality of power couplers 2100-1, 2100-2, 2100-3, 2100-4, 2100-5, 2100-6, 2100-7 and 2100-8, a plurality of first channel selection structures 200-1, 2200-2, 2200-3 and 2200-4, a plurality of second channel selection structures 2300-1, 2300-2 and 2300-3, and a transceiving channel selector 2400.

The plurality of power couplers 2100-1 to 2100-8 may be connected to the plurality of channels 1100-1 to 1100-8, and may serve to obtain power from the plurality of channels 1100-1 to 1100-8. One power coupler may be connected to one channel, and the number of the power couplers 2100-1 to 2100-8 may be substantially equal to the number of the channels 1100-1 to 1100-8. For example, the power coupler 2100-1 may be directly connected to the first channel 1100-1. For example, as illustrated in FIG. 1, the plurality of power couplers 2100-1 to 2100-8 may be directional couplers.

The plurality of first channel selection structures 2200-1 to 2200-4 may be connected to the plurality of power couplers 2100-1 to 2100-8. Each of the plurality of first channel selection structures 2200-1 to 2200-4 may be connected to two adjacent power couplers. For example, the first channel selection structure 2200-1 may be directly connected to the power couplers 2100-1 and 2100-2, and may add or sum two signals provided from the power couplers 2100-1 and 2100-2 or may block at least one of the two signals.

The plurality of second channel selection structures 2300-1 to 2300-3 may be connected to the plurality of first channel selection structures 2200-1 to 2200-4. Each of the plurality of second channel selection structures 2300-1 to 2300-3 may be connected to two adjacent channel selection structures. For example, the second channel selection structure 2300-1 may be directly connected to the first channel selection structures 2200-1 and 2200-2, and may add or sum two signals provided from the first channel selection structures 2200-1 and 2200-2 or may block at least one of the two signals.

In some example embodiments, each of the plurality of first and second channel selection structures 2200-1 to 2200-4 and 2300-1 to 2300-3 may not be implemented as a simple switch (e.g., a single-pole double-throw (SPDT) switch), but may be implemented such that two input signals are summed, both of the two input signals are not passed, or only one signal is passed and the other signal is not passed. In addition, each of the plurality of first and second channel selection structures 2200-1 to 2200-4 and 2300-1 to 2300-3 may be implemented such that the impedance matching is maintained accurately even when the signal is not passed. For example, as illustrated in FIG. 1, each channel selection structure may include a switched Wilkinson combiner (or divider). However, example embodiments are not limited thereto, and each channel selection structure may be implemented with various structures to perform the above-described roles and functions.

The transceiving channel selector 2400 may be connected to the second channel selection structure 2300-3, and may receive the test result signal TRS. The transceiving channel selector 2400 may serve to select whether to calibrate phases and gains of the plurality of transmission paths TX_P1 to TX_P8 or to calibrate phases and gains of the plurality of reception paths RX_P1 to RX_P8. For example, the transceiving channel selector 2400 may include a double-pole double-throw (DPDT) switch. An operation of the transceiving channel selector 2400 will be described with reference to FIGS. 8A and 8B.

The power detector 2500 detects power of the selected two channels based on the test result signal TRS provided from the selection unit. For example, the power detector 2500 may include an envelope detector. An envelope of the test result signal TRS that is obtained by signals from the selected two channels may be measured, and a difference in phase and gain between the selected two channels may be efficiently detected and calibrated based on a magnitude of the envelope.

The analog-to-digital converter 2600 performs an analog-to-digital conversion on an output of the power detector 2500. The calibrator 2700 calibrates the phases and the gains between the plurality of channels 1100-1 to 1100-8 based on an output of the analog-to-digital converter 2600. Although not illustrated in detail, the calibrator 2700 may generate a plurality of control signals (or calibration signals) for controlling the phases and gains of the plurality of channels 1100-1 to 1100-8, and may provide the plurality of control signals to the plurality of channels 1100-1 to 1100-8.

The calibrator 2700 calibrates the phases and the gains of the plurality of channels 1100-1 to 1100-8 based on a multi-channel (or two-channel) signal comparison scheme. For example, one of the plurality of channels 1100-1 to 1100-8 is set or determined as a reference channel, phases and gains of remaining channels other than the reference channel among the plurality of channels 1100-1 to 1100-8 are sequentially optimized based on or using the reference channel, and a phase and a gain of the reference channel is optimized based on one of the remaining channels. In some example embodiments, an operation of setting the reference channel may be performed two or more times. In other words, the reference channel may be changed at least once. A calibration operation of the calibrator 2700 will be described in detail with reference to FIG. 3 and subsequent figures.

Figure 2:
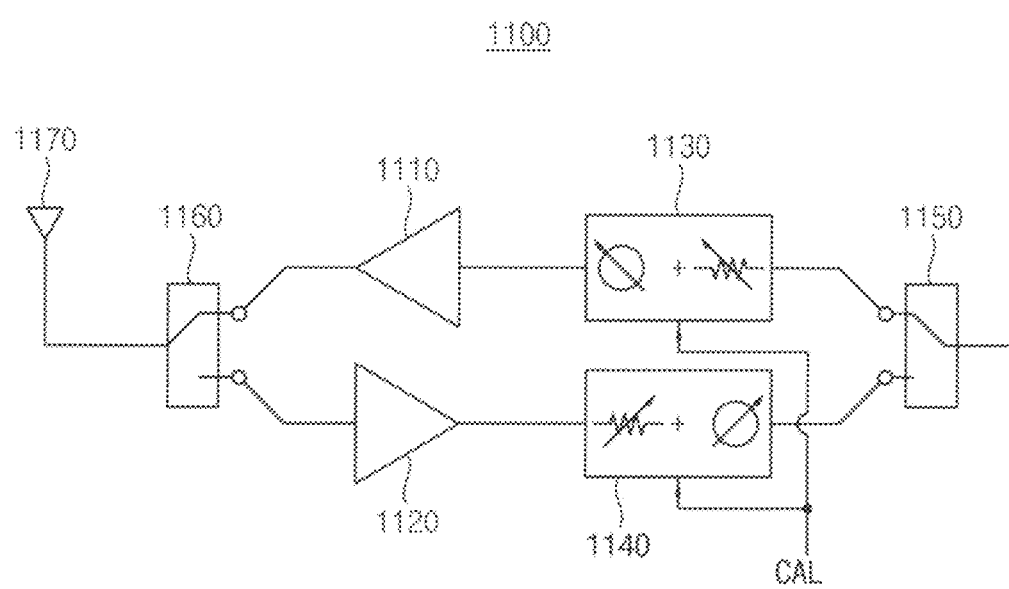
FIG. 2 is a block diagram illustrating an example of a channel included in a multi-channel beamforming system according to example embodiments.

FIG. 2 is a block diagram illustrating an example of a channel included in a multi-channel beamforming system according to example embodiments.

Referring to FIG. 2, a channel 1100 may include a power amplifier (PA) 1110, a low noise amplifier (LNA) 1120, variable gain phase shifters (VG-PSs) 1130 and 1140, switch circuits 1150 and 1160, and an antenna 1170.

The power amplifier 1110 may amplify a signal to be transmitted through the antenna 1170 in the transmission mode. For example, the power amplifier 1110 may include a multi mode power amplifier (MM-PA) that operates in two or more amplification modes and performs a transmission gain adjustment (or control) function for the signal.

The low noise amplifier 1120 may amplify a signal received through the antenna 1170 in the reception mode. For example, the low noise amplifier 1120 may include a variable gain low noise amplifier (VG-LNA) that performs a reception gain adjustment function and further performs a phase change compensation function.

The variable gain phase shifter 1130 may independently perform a transmission gain adjustment function and a transmission phase adjustment function for an input provided to the power amplifier 1110 at one time (or at the same time or simultaneously) in the transmission mode. The variable gain phase shifter 1140 may independently perform a reception gain adjustment function and a reception phase adjustment function for an output of the low noise amplifier 1120 at one time in the reception mode. The variable gain phase shifters 1130 and 1140 may receive a control signal CAL provided from a calibrator (e.g., the calibrator 2700 in FIG. 1), and may perform the operation of calibrating the phases and gains between channels according to example embodiments based on the control signal CAL.

In each of the variable gain phase shifters 1130 and 1140, an output signal may be generated by adjusting or controlling magnitudes and directions of at least two in-phase vectors and at least two quadrature vectors and by summing the at least two in-phase vectors and the at least two quadrature vectors. Thus, the phase and gain of the signal may be independently and efficiently adjusted or controlled at one time using one element or block.

The power amplifier 1110 and the variable gain phase shifter 1130 may form a transmission path, and the low noise amplifier 1120 and the variable gain phase shifter 1140 may form a reception path. In some example embodiments, the channel 1100 may include only one variable gain phase shifter, and the one variable gain phase shifter may be shared by the transmission path and the reception path.

The switch circuits 1150 and 1160 may enable or activate one of the transmission path and the reception path. For example, each of the switch circuits 1150 and 1160 may include an SPDT switch. As illustrated in FIG. 2, when the switch circuits 1150 and 1160 are electrically connected to the power amplifier 1110 and the variable gain phase shifter 1130, the transmission path may be enabled. Although not illustrated in FIG. 2, when the switch circuits 1150 and 1160 are connected to the low noise amplifier 1120 and the variable gain phase shifter 1140, the reception path may be enabled.

Positions to which a power coupler (e.g., the power coupler 2100-1 in FIG. 1) is connected may correspond to an output terminal of the transmission path and an input terminal of the reception path. For example, the power coupler may be connected between the antenna 1170 and the switch circuit 1160.

Figure 3:
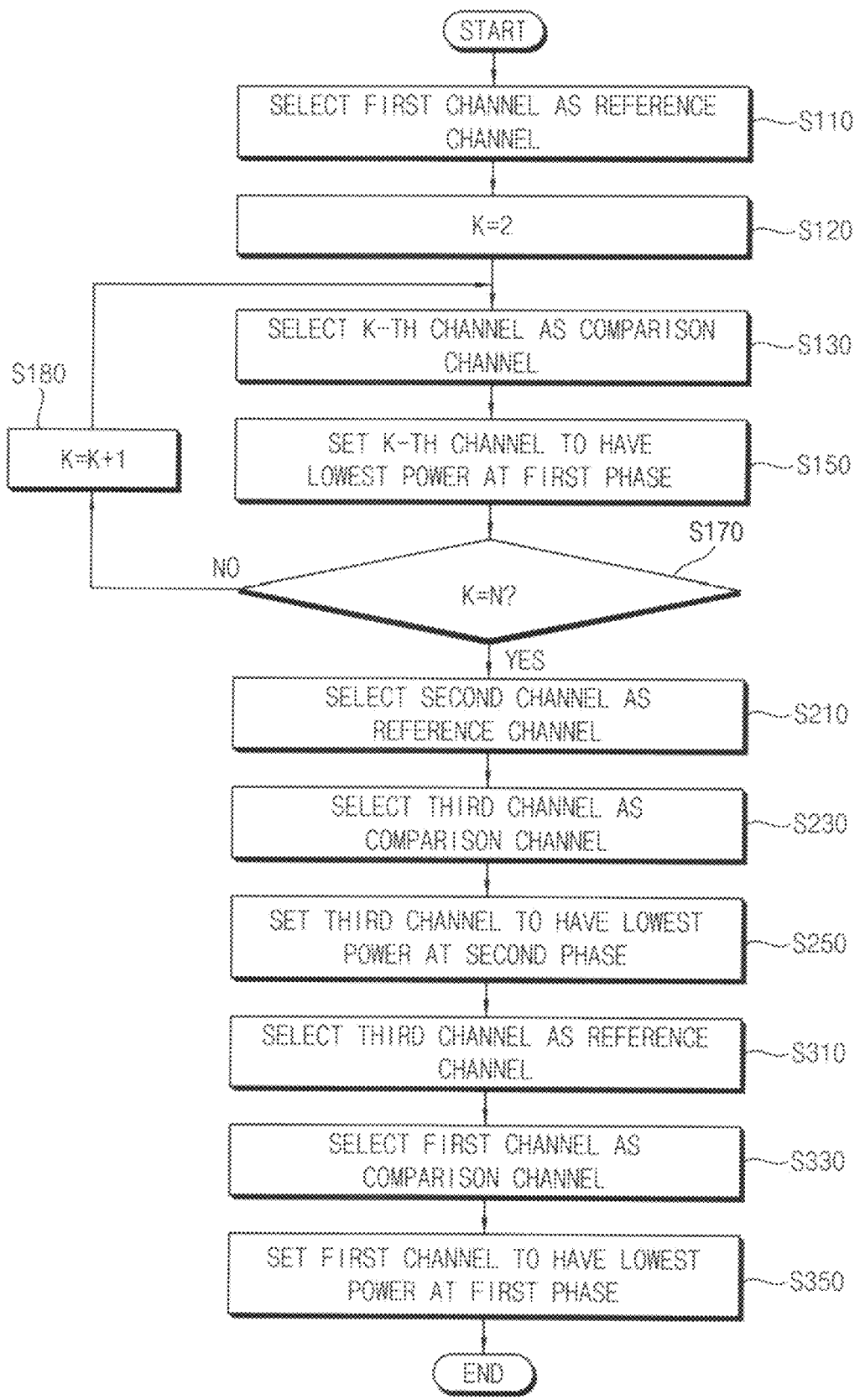
FIG. 3 is a flowchart illustrating a channel calibration method according to example embodiments.

FIG. 3 is a flowchart illustrating a channel calibration method according to example embodiments. The channel calibration method of FIG. 3 will be described based on the multi-channel beamforming system 100 of FIG. 1 and the calibration circuit included therein.

Referring to FIGS. 1 and 3, in a channel calibration method using the calibration circuit included in the multi-channel beamforming system 100 according to example embodiments, the first channel 1100-1 is selected as a reference channel (step S110). Next, the remaining channels, e.g., the second to eighth channels 1100-2 to 1100-8 are sequentially selected as a comparison channel, and the second to eighth channels 1100-2 to 1100-8 are sequentially set to have the lowest power (e.g., power lower than a reference power) at a first phase. For example, the first phase may be about 0 degree.

For example, K may be set to two (step S120), a K-th channel (e.g., the second channel 1100-2) may be selected as a comparison channel (step S130), and the K-th channel may be set to have the lowest power at the first phase (step S150). Step S150 will be described with reference to FIGS. 4 and 5.

When both steps S130 and S150 are not performed for until the last channel (e.g., the eighth channel 1100-8) (step S170: NO), K may be increased by one (step S180), and steps S130 and S150 may be repeated for the next channel (e.g., the third channel 1100-3). Based on such repetitions, the second to eighth channels 1100-2 to 1100-8 other than the first channel 1100-1 may be calibrated to have optimal phase/gain states at the same phase.

When both steps S130 and S150 are performed for until the last channel (e.g., the eighth channel 1100-8) (step S170: YES), the first channel 1100-1 may be calibrated to have an optimal phase/gain state at the same phase.

For example, the second channel 1100-2 is selected as the reference channel (step S210), the third channel 1100-3 is selected as the comparison channel (step S230), and the third channel 1100-3 is set to have the lowest power at a second phase different from the first phase (step S250). For example, the second phase may be about 180 degrees. Step S250 will be described with reference to FIG. 6.

Thereafter, the third channel 1100-3 is selected as the reference channel (step S310), the first channel 1100-1 is selected as the comparison channel (step S330), and the first channel 1100-1 is set to have the lowest power at the first phase (step S350). Step S350 may be substantially the same as step S150. Finally, all of the first to eighth channels 1100-1 to 1100-8 may be calibrated to have the optimal phase/gain states at the same phase.

The processes performed in steps S150, S250 and S350 may be referred to as an offset finding function.

Although example embodiments are described that a specific channel is selected as the reference channel and/or the comparison channel in steps S110, S210, S230, S310 and S330, example embodiments are not limited thereto. For example, the reference channel selected in step S110 may be any one of the plurality of channels 1100-1 to 1100-8, the reference channel and the comparison channel selected in steps S210 and S230 may be any two of the remaining channels other than the channel selected in step S110, the reference channel selected in step S310 may be the same channel as the channel selected in step S230, and the comparison channel selected in step S330 may be the same channel as the channel selected in step S110.

Figure 4:
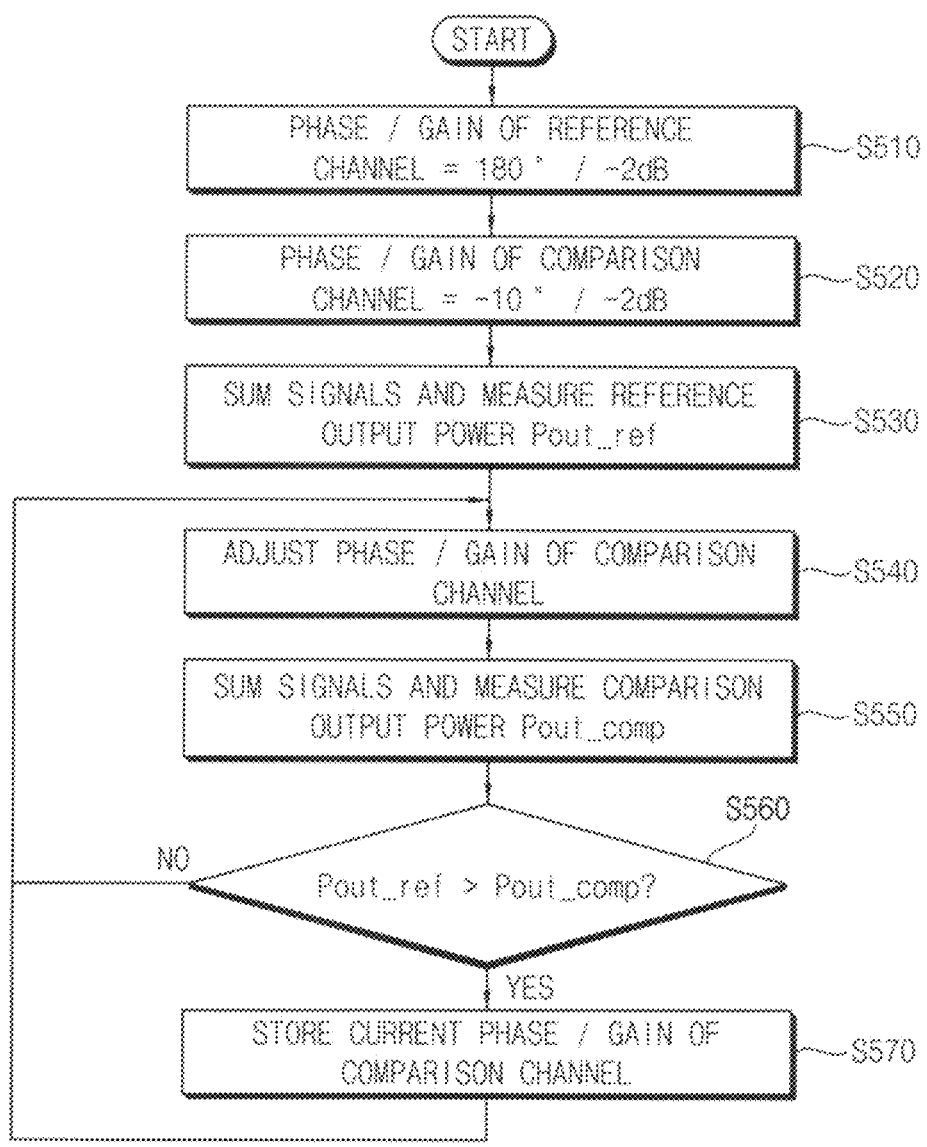
FIG. 4 is a flowchart illustrating an example of step S150 in FIG. 3.
Figure 5:
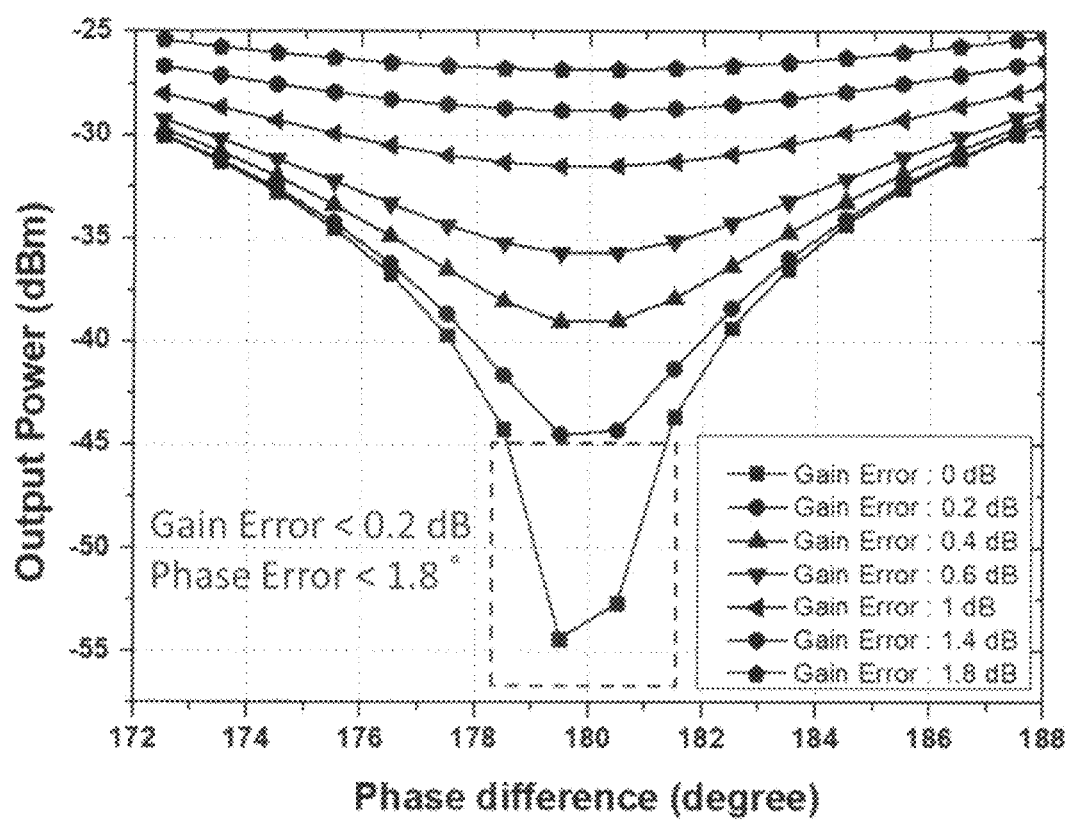
FIG. 5 is a diagram for describing an operation of FIG. 4.

FIG. 4 is a flowchart illustrating an example of step S150 in FIG. 3. FIG. 5 is a diagram for describing an operation of FIG. 4. FIG. 6 is a flowchart illustrating an example of step S250 in FIG. 3.

Referring to FIGS. 1, 3, 4 and 5, in setting the K-th channel to have the lowest power at the first phase (step S150), an operation will be described based on an example where K=2, e.g., the second channel 1100-2 is selected as the comparison channel, and based on an example where the first phase and the second phase are about 0 degree and about 180 degrees, respectively.

A phase and a gain of the first channel 1100-1, which is the reference channel, may be set to the second phase and a first gain (step S510). A phase and a gain of the second channel 1100-2, which is the comparison channel, may be set to a third phase and the first gain (step S520). The remaining channels 1100-3 to 1100-8 other than the first and second channels 1100-1 and 1100-2 may be in an off-state, or signals output from the remaining channels 1100-3 to 1100-8 may be blocked using the first channel selection structures 2200-2 to 2200-4. For example, the third phase may be about −10 degrees that is close to the first phase, and the first gain may be about −2 dB. However, example embodiments are not limited thereto, and the third phase and the first gain may be variously determined according to example embodiments. Alternatively, step S520 may be described as an operation of storing a current (or present) phase and gain code value (or state) of the comparison channel.

The test result signal TRS may be obtained by summing signals obtained from the first and second channels 1100-1 and 1100-2 based on the test signal TS, and reference output power Pout ref may be measured based on the test result signal TRS (step S530).

Next, only the phase and the gain of the second channel 1100-2 may be adjusted while the phase and the gain of the first channel 1100-1 are maintained and/or fixed (step S540). After the phase and the gain of the second channel 1100-2 are adjusted, the test result signal TRS may be obtained again by summing signals obtained again from the first and second channels 1100-1 and 1100-2 based on the test signal TS, and comparison output power Pout_comp may be measured based on the test result signal TRS (step S550).

When the comparison output power Pout_comp is lower (or less) than the reference output power Pout_ref (step S560: YES), it may represent or indicate that the phase and the gain adjusted in step S540 are closer to the optimal phase/gain state than the phase and the gain before the adjustment, and thus the current phase and the current gain of the second channel 1100-2 may be stored (step S570). Thereafter, the comparison output power Pout_comp at the current phase and the current gain may be set as the reference output power Pou_ref, and steps S540, S550 and S560 may be repeated based on the newly set reference output power Pout_ref.

When the comparison output power Pout_comp is higher (or greater) than or equal to the reference output power Pout_ref (step S560: NO), it may represent that the phase and the gain before the adjustment are closer to the optimal phase/gain state than the phase and the gain adjusted in step S540, and thus steps S540, S550, and S560 may be repeated without performing step S570.

Based on the repetitions of steps S540, S550, and S560, the phase and the gain of the second channel 1100-2 may be set to have the smallest phase error (e.g., zero-degree phase error) and the smallest gain error (e.g., zero-dB gain error). For example, when step S570 is not performed continuously for more than a reference number of times even though steps S540, S550 and S560 are repeated, it may be determined that the stored phase and the stored gain of the second channel 1100-2 are in the optimal phase/gain state, and the process may be terminated.

As illustrated in FIG. 5, when rotating the reference channel by about 180 degrees, and when summing two signals from the reference channel and the comparison channel while changing the phase and the gain of the comparison channel, the lowest power (e.g., power lower than the reference power) may be detected in a case where a phase difference between the two signals is about 180 degrees and there is no gain error. The adjustment operation may be performed in this manner so that the comparison channel has the optimal phase/gain at about 0 degree, e.g., the comparison channel has the zero-degree phase error and the zero-dB gain error.

After the above-described process is completed for the second channel 1100-2, the above-described process may be sequentially performed for the third to eighth channels 1100-3 to 1100-8.

Referring to FIGS. 1, 3 and 6, in setting the third channel 1100-3 to have the lowest power at the second phase (step S250), an operation will be described based on an example where the first phase and the second phase are about 0 degree and about 180 degrees, respectively.

The phase and the gain of the second channel 1100-2, which is the reference channel, may be set to the first phase and the first gain, which are set by the operations of FIGS. 4 and 5 (step S610). A phase and a gain of the third channel 1100-3, which is the comparison channel, may be set as a fourth phase and the first gain (step S620). For example, the fourth phase may be about 170 degrees that is close to the second phase, and the first gain may be about −2 dB. However, example embodiments are not limited thereto, and the fourth phase and the first gain may be variously determined according to example embodiments. Alternatively, step S620 may be described as an operation of storing a current phase and gain code value (or state) of the comparison channel. Steps S610 and S620 may be substantially the same as steps S510 and S520 in FIG. 4, respectively, except that the phase setting value is changed.

Thereafter, steps S630, S640, S650, S660 and S670 may be substantially the same as steps S530, S540, S550, S560 and S570 in FIG. 4, respectively, and the descriptions repeated with FIG. 4 will be omitted.

FIGS. 7A, 7B, 7C and 7D are diagrams for describing an operation of FIG. 3.

Figure 7A:
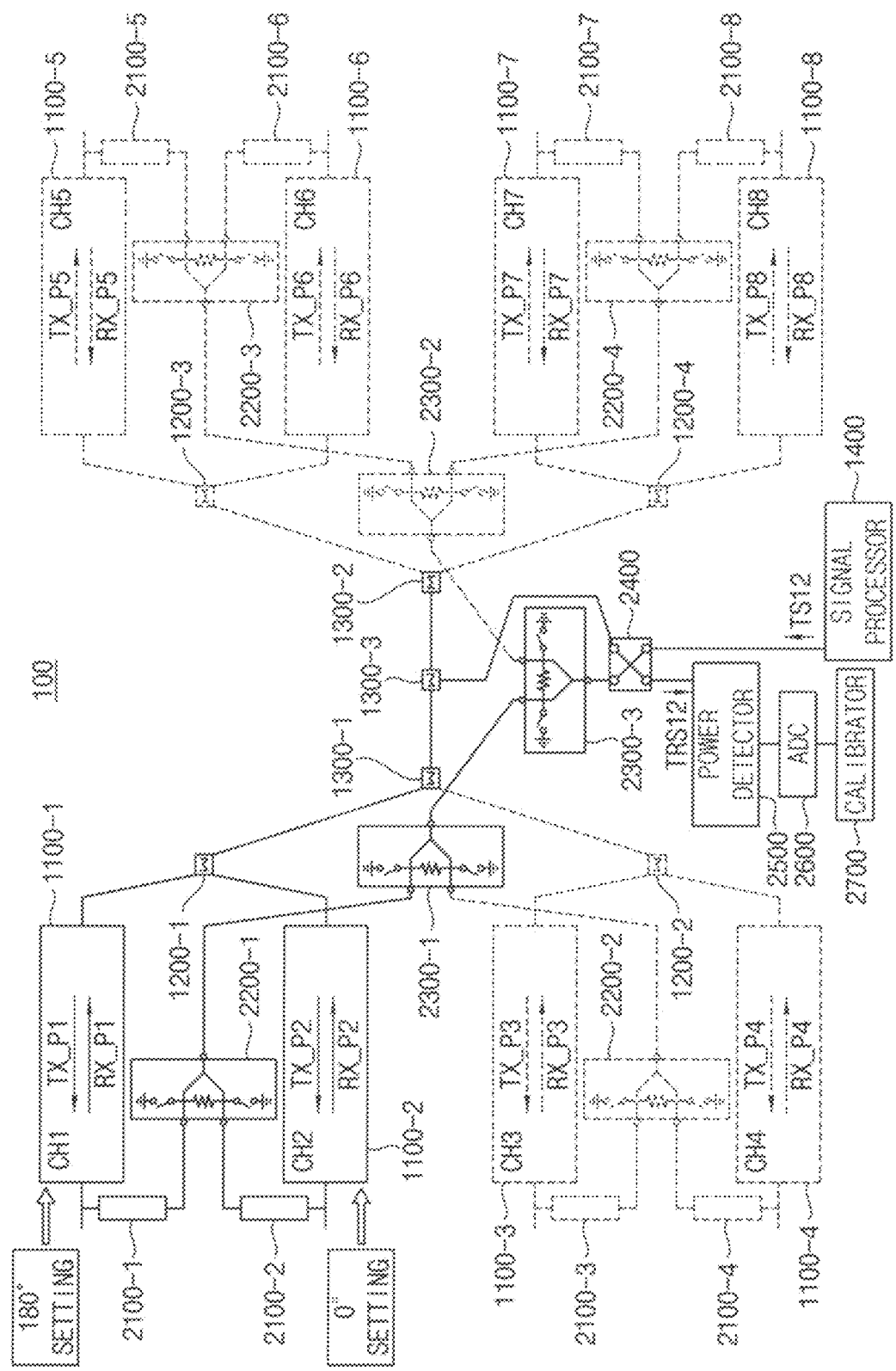
Figure 7B:
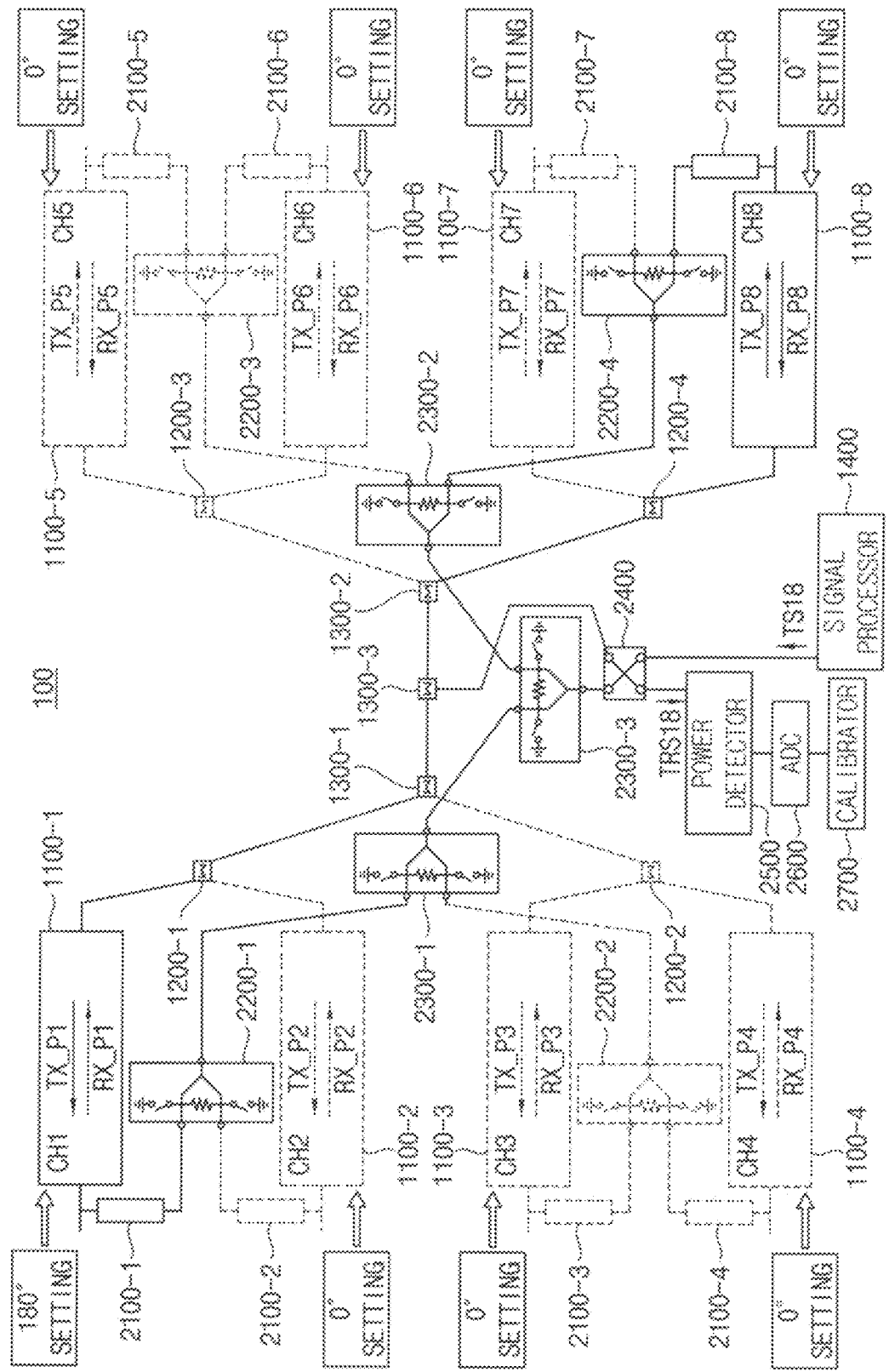

First, referring to FIGS. 7A and 7B, an example where steps S110, S120, S130, S150, S170 and S180 in FIG. 3 are performed is illustrated.

For example, as illustrated in FIG. 7A, the calibration circuit may enable only the first and second channels 1100-1 and 1100-2 and signal paths related thereto, and may disable the remaining channels 1100-3 to 1100-8 and signal paths related thereto. In FIG. 7A and subsequent figures, disabled components and disabled signal paths are illustrated by dotted lines. The calibration circuit may set the first channel 1100-1 to about 180 degrees, and may set the second channel 1100-2 to about 0 degree by performing the process described with reference to FIGS. 4 and 5. To set the second channel 1100-2, a test signal TS12 may be provided to the first and second channels 1100-1 and 1100-2, and a test result signal TRS12 may be received from the first and second channels 1100-1 and 1100-2.

Similarly, each of the third to seventh channels 1100-3 to 1100-7 may be set to about 0 degree.

Lastly, as illustrated in FIG. 7B, the calibration circuit may enable only the first and eighth channels 1100-1 and 1100-8 and signal paths related thereto, and may set the eighth channel 1100-8 to about 0 degree by performing the process described with reference to FIGS. 4 and 5. To set the eighth channel 1100-8, a test signal TS18 may be provided to the first and eighth channels 1100-1 and 1100-8, and a test result signal TRS18 may be received from the first and eighth channels 1100-1 and 1100-8.

Figure 7C:
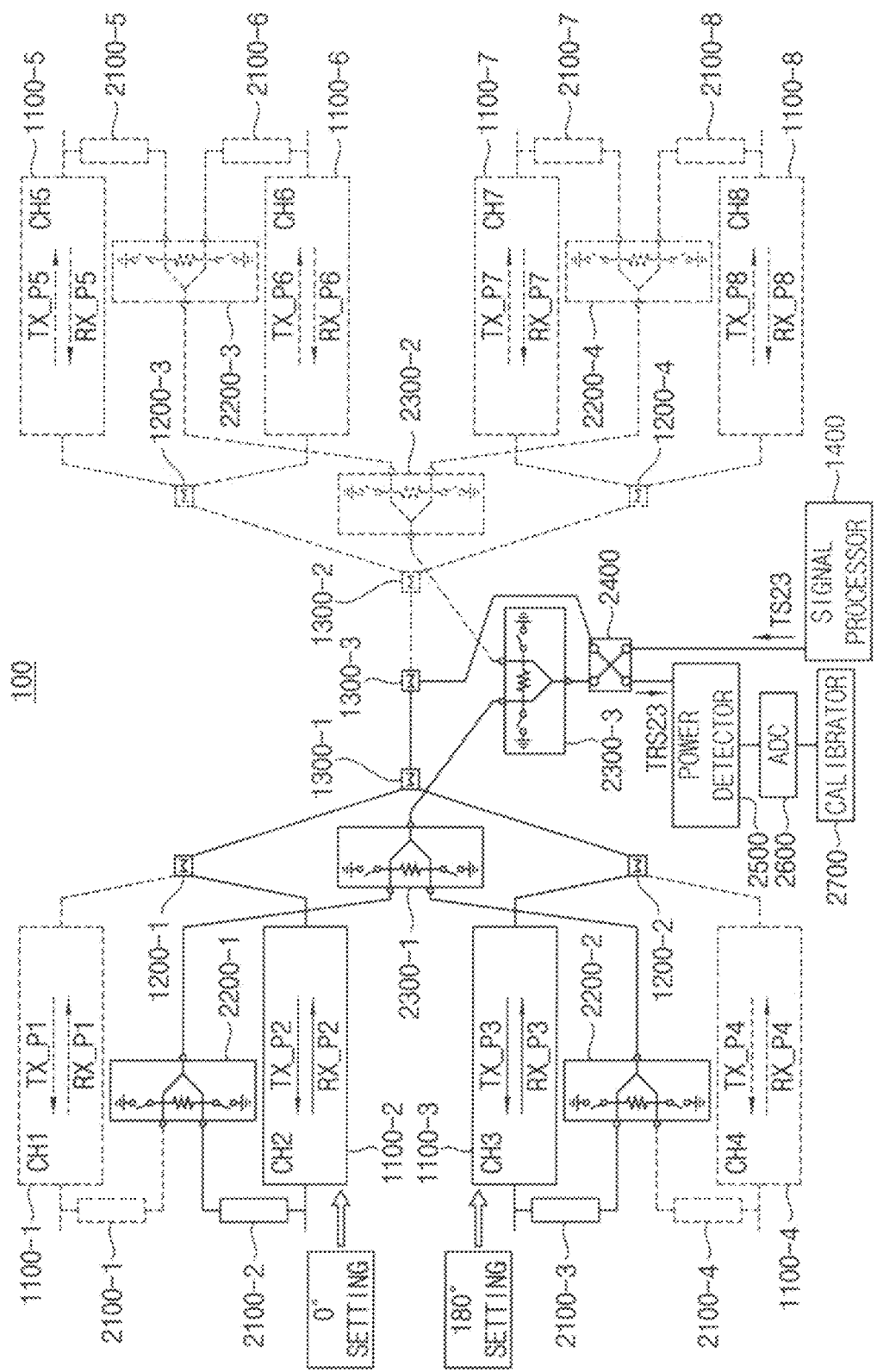

Next, referring to FIG. 7C, an example where steps S210, S230 and S250 in FIG. 3 are performed is illustrated.

For example, the calibration circuit may enable only the second and third channels 1100-2 and 1100-3 and signal paths related thereto, may set the second channel 1100-2 to about 0 degree, and may set the third channel 1100-3 to about 180 degrees by performing the process described with reference to FIG. 6. To set the third channel 1100-3, a test signal TS23 may be provided to the second and third channels 1100-2 and 1100-3, and a test result signal TRS23 may be received from the second and third channels 1100-2 and 1100-3.

Thereafter, referring to FIG. 7D, an example where steps S310, S330 and S350 in FIG. 3 are performed is illustrated.

For example, the calibration circuit may enable only the first and third channels 1100-1 and 1100-3 and signal paths related thereto, may set the third channel 1100-3 to about 180 degrees, and may set the first channel 1100-1 to about 0 degree by performing the process described with reference to FIGS. 4 and 5. To set the first channel 1100-1, a test signal TS31 may be provided to the first and third channels 1100-1 and 1100-3, and a test result signal TRS31 may be received from the first and third channels 1100-1 and 1100-3.

When all of the above-described processes are completed, all of the plurality of channels 1100-1 to 1100-8 may be set with the same phase, e.g., may have the optimal phase/gain states at the same phase, and thus phase and gain errors occurring in a chip may be compensated.

Although example embodiments are described that the error calibration is performed for only one phase (e.g., the first phase), example embodiments are not limited thereto, and the error calibration may be performed for a plurality of phases (or two or more phases). For example, to calibrate errors caused by differences between phase states of the phase shifter, the synchronization may be performed in all phases by changing the phase of the reference channel, e.g., by about 11.2 degrees in 5-bit phase shifter, and thus the more accurate beam pattern may be generated or formed.

Figure 8A:
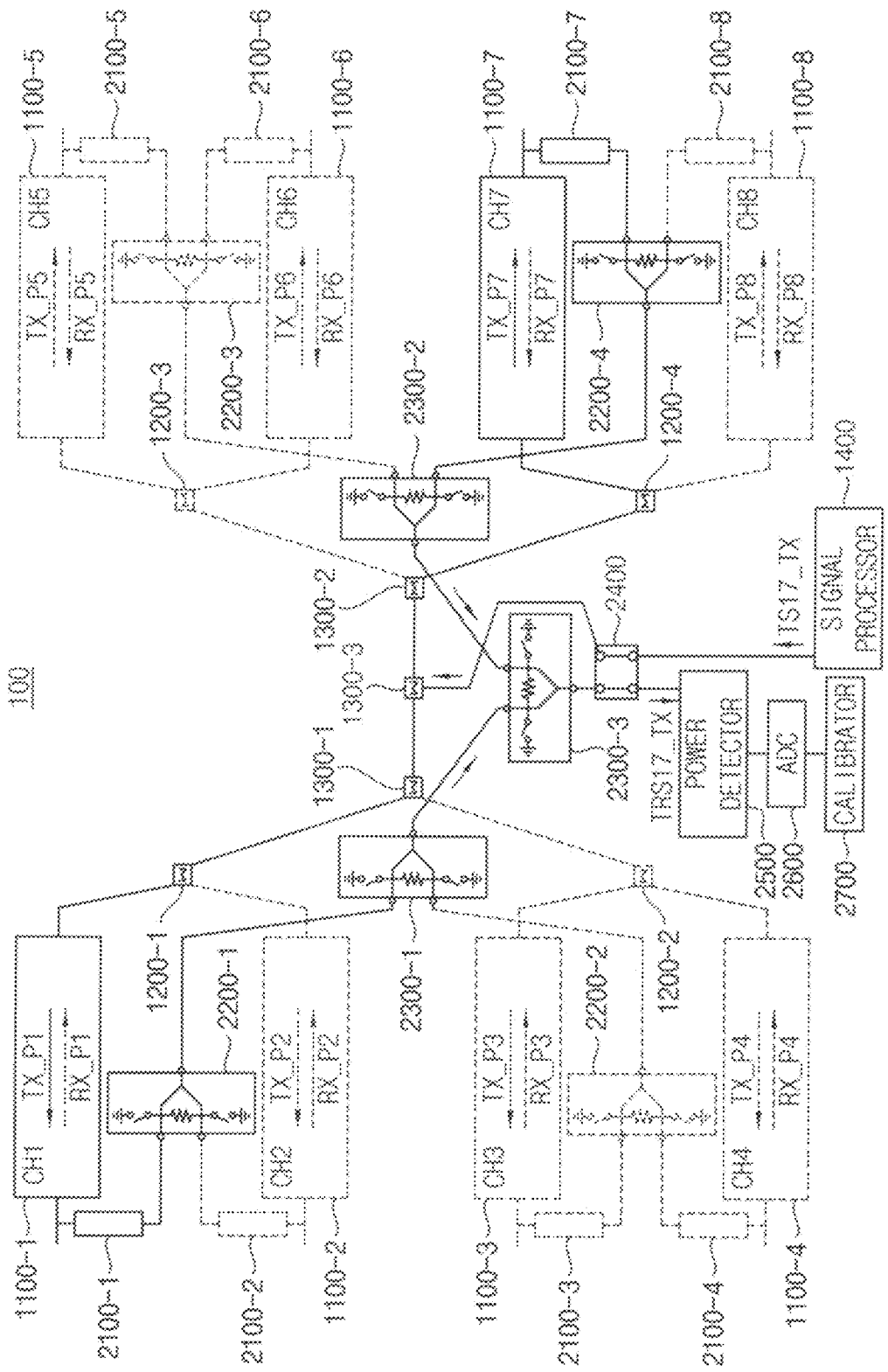
FIGS. 8A and 8B are diagrams for describing operations of a calibration circuit and a multi-channel beamforming system of FIG. 1.
Figure 8B:
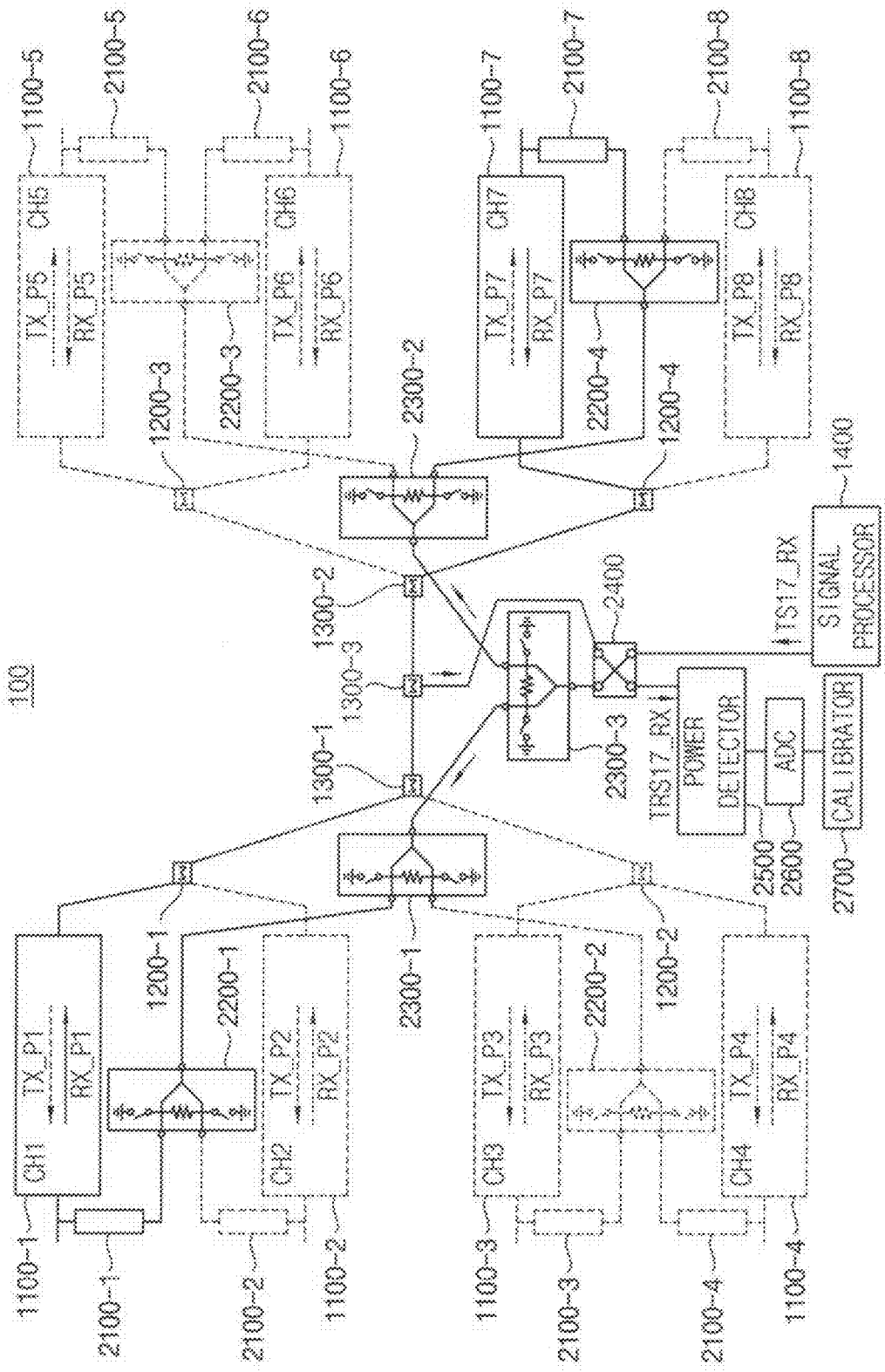

FIGS. 8A and 8B are diagrams for describing operations of a calibration circuit and a multi-channel beamforming system of FIG. 1.

Referring to FIGS. 2, 8A and 8B, both the transmission path and the reception path may be relatively easily and simply calibrated using the switch circuits (e.g., the switch circuits 1150 and 1160 in FIG. 2) included in the plurality of channels 1100-1 to 1100-8 and the transceiving channel selector 2400 included in the calibration circuit. FIGS. 8A and 8B illustrate an example where the calibration operation for the seventh channel 1100-7 is performed by selecting the first and seventh channels 1100-1 and 1100-7.

As illustrated in FIG. 8A, the transmission paths TX_P1 and TX_P7 in the first and seventh channels 1100-1 and 1100-7 may be enabled using the switch circuits included in the first and seventh channels 1100-1 and 1100-7, and the DPDT switch included in the transceiving channel selector 2400 may be connected as shown. A test signal TS17_TX may correspond to the transmission signal to be output in the transmission mode. The test signal TS17_TX may be provided to input terminals of the transmission paths TX_P1 and TX_P7 through the transceiving channel selector 2400 and the combiners/dividers 1200-1, 1200-4 and 1300-1 to 1300-3. Signals may be fed back from output terminals of the transmission paths TX_P1 and TX_P7, the feedback signals may be received as a test result signal TRS17_TX through the power couplers 2100-1 and 2100-7 and the channel selection structures 2200-1, 2200-4 and 2300-1-2300-3, and the test result signal TRS17_TX may be provided to the transceiving channel selector 2400. The transmission path TX_P7 in the seventh channel 1100-7 may be set based on the test signal TS17_TX and the test result signal TRS17_TX.

In addition, as illustrated in FIG. 8B, the reception paths RX_P1 and RX_P7 in the first and seventh channels 1100-1 and 1100-7 may be enabled using the switch circuits included in the first and seventh channels 1100-1 and 1100-7, and the DPDT switch included in the transceiving channel selector 2400 may be connected as shown. A test signal TS17_RX may correspond to the reception signal received in the reception mode. The test signal TS17_RX may be provided to input terminals of the reception paths RX_P1 and RX_P7 through the transceiving channel selector 2400, the channel selection structures 2200-1, 2200-4 and 2300-1 to 2300-3, and the power couplers 2100-1 and 2100-7. Signals output from output terminals of the reception paths RX_P1 and RX_P7 may be received as a test result signal TRS17_RX through the combiners/dividers 1200-1, 1200-4 and 1300-1 to 1300-3, and the test result signal TRS17_RX may be provided to the transceiving channel selector 2400. The reception path RX_P7 in the seventh channel 1100-7 may be set based on the test signal TS17_RX and the test result signal TRS17_RX.

Based on the above-described scheme, the plurality of transmission paths TX_P1 to TX_P8 and the plurality of reception paths RX_P1 to RX_P8 may be independently calibrated. In other words, the process described with reference to FIGS. 3 through 7 may be performed for the plurality of transmission paths TX_P1 to TX_P8, and the process described with reference to FIGS. 3 through 7 may also be performed for the plurality of reception paths RX_P1 to RX_P8.

In the calibration circuit, the multi-channel beamforming system and the channel calibration method according to example embodiments, the phases and the gains of the plurality of channels 1100-1 to 1100-8 may be calibrated based on the multi-channel signal comparison scheme, and the envelope detector may be used for comparing the feedback signals, rather than using a local oscillator (LO) and in-phase/quadrature phase (I/Q) mixers. The difference in phase and gain between two channels may be detected by fixing the phase and gain of one channel, by adjusting the phase and gain of another channel, and by measuring the envelope of the summed signal from the two channels, and the channel may be calibrated by using or feeding back the difference. Accordingly, it may be less sensitive to frequency, and there may be no LO problems and direct current (DC) offset problems because the I/Q mixers are not used. In addition, both the transmission and reception paths may be easily calibrated by changing only the direction of the switches.

Figure 9:
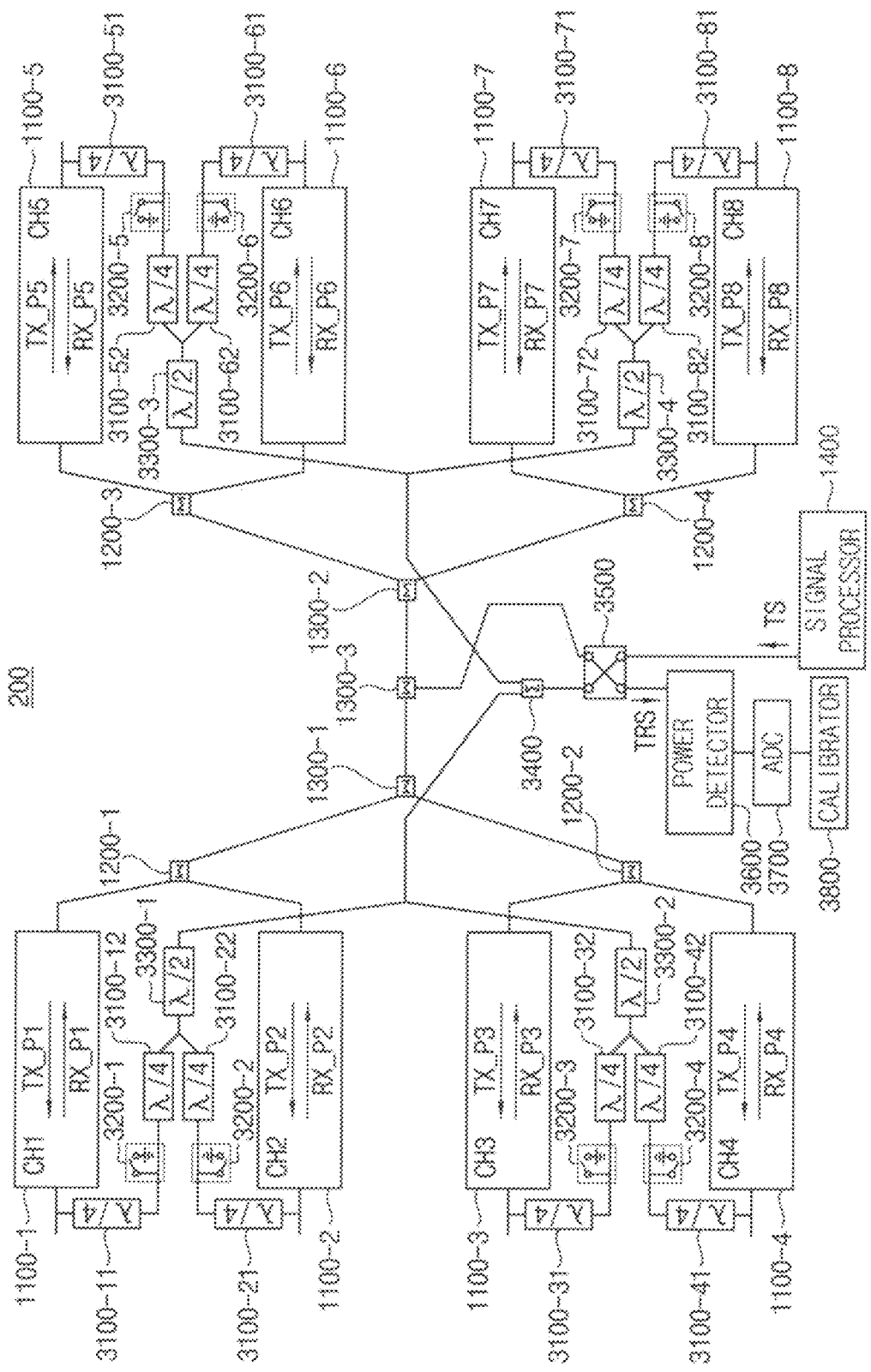
FIG. 9 is a block diagram illustrating a calibration circuit and a multi-channel beamforming system including the calibration circuit according to example embodiments.

FIG. 9 is a block diagram illustrating a calibration circuit and a multi-channel beamforming system including the calibration circuit according to example embodiments. The descriptions repeated with FIG. 1 will be omitted.

Referring to FIG. 9, a multi-channel beamforming system 200 includes a plurality of channels 1100-1 to 1100-8, and a calibration circuit. The multi-channel beamforming system 200 may further include a plurality of combiners/dividers 1200-1 to 1200-4 and 1300-1 to 1300-3, and a signal processor 1400.

The multi-channel beamforming system 200 of FIG. 9 may be substantially the same as the multi-channel beamforming system 100 of FIG. 1, except that a configuration of the calibration circuit is changed.

The calibration circuit includes a selection unit, a power detector 3600, an analog-to-digital converter 3700 and a calibrator 3800. The power detector 3600, the analog-to-digital converter 3700 and the calibrator 3800 may be substantially the same as the power detector 2500, the analog-to-digital converter 2600 and the calibrator 2700 in FIG. 1, respectively.

The selection unit may include a plurality of quarter-wavelength ($\lambda/4$) transformers 3100-11, 3100-21, 3100-31, 3100-41, 3100-51, 3100-61, 3100-71, 3100-81, 3100-12, 3100-22, 3100-32, 3100-42, 3100-52, 3100-62, 3100-72 and 3100-82, a plurality of switches 3200-1, 3200-2, 3200-3, 3200-4, 3200-5, 3200-6, 3200-7 and 3200-8, a plurality of half-wavelength ($\lambda/2$) transformers 3300-1, 3300-2, 3300-3 and 3300-4, a combiner/divider 3400, and a transceiving channel selector 3500. The wavelength ($\lambda$) may represent a wavelength of a signal transmitted and received through the multi-channel beamforming system 200.

The plurality of quarter-wavelength transformers 3100-11 to 3100-81 and 3100-12 to 3100-82 may be connected to the plurality of channels 1100-1 to 1100-8. Two quarter-wavelength transformers may be connected to one channel, and the number of the quarter-wavelength transformers 3100-11 to 3100-81 and 3100-12 to 3100-82 may be substantially equal to twice the number of the channels 1100-1 to 1100-8. For example, the quarter-wavelength transformer 3100-11 may be directly connected to the first channel 1100-1, and the quarter-wavelength transformer 3100-12 may be directly connected to the quarter-wavelength transformer 3100-11.

The plurality of switches 3200-1 to 3200-8 may be connected to the plurality of quarter-wavelength transformers 3100-11 to 3100-81 and 3100-12 to 3100-82, and may be connected to the plurality of channels 1100-1 to 1100-8 through the plurality of quarter-wavelength transformers 3100-11 to 3100-81 and 3100-12 to 3100-82. One switch may be connected to one channel, and the number of the switches 3200-1 to 3200-8 may be substantially equal to the number of the channels 1100-1 to 1100-8. For example, the switch 3200-1 may be directly connected between a node between the quarter-wavelength transformers 3100-11 and 3100-12 and a ground voltage. When the switch 3200-1 is opened, the first channel 1100-1 may be selected.

The plurality of half-wavelength transformers 3300-1 to 3300-4 may be connected to the plurality of quarter-wavelength transformers 3100-12 to 3100-82. Each of the plurality of half-wavelength transformers 3300-1 to 3300-4 may be connected to two adjacent quarter-wavelength transformers. For example, the half-wavelength transformer 3300-1 may be directly connected to the quarter-wavelength transformers 3100-12 and 3100-22.

The combiner/divider 3400 may be connected to the plurality of half-wavelength transformers 3300-1 to 3300-4, and may operate similarly to the combiners/dividers 1200-1 to 1200-4 and 1300-1 to 1300-3. The transceiving channel selector 3500 may be connected to the combiner/divider 3400, may receive the test result signal TRS, and may be substantially the same as the transceiving channel selector 2400 in FIG. 1.

Unlike the multi-channel beamforming system 100 of FIG. 1, the selection unit included in the multi-channel beamforming system 200 of FIG. 9 cannot simultaneously select two adjacent channels. For example, when the first channel 1100-1 is selected as the reference channel, the second to fourth channels 1100-2 to 1100-4 cannot be selected as the comparison channel, and only the fifth to eighth channels 1100-5 to 1100-8 may be selected as the comparison channel. Therefore, in the multi-channel beamforming system 200 of FIG. 9, the channel calibration method described with reference to FIGS. 3 through 7 cannot be performed, and a channel calibration method, which will be described with reference to FIGS. 10 through 13, may be performed.

Figure 10:
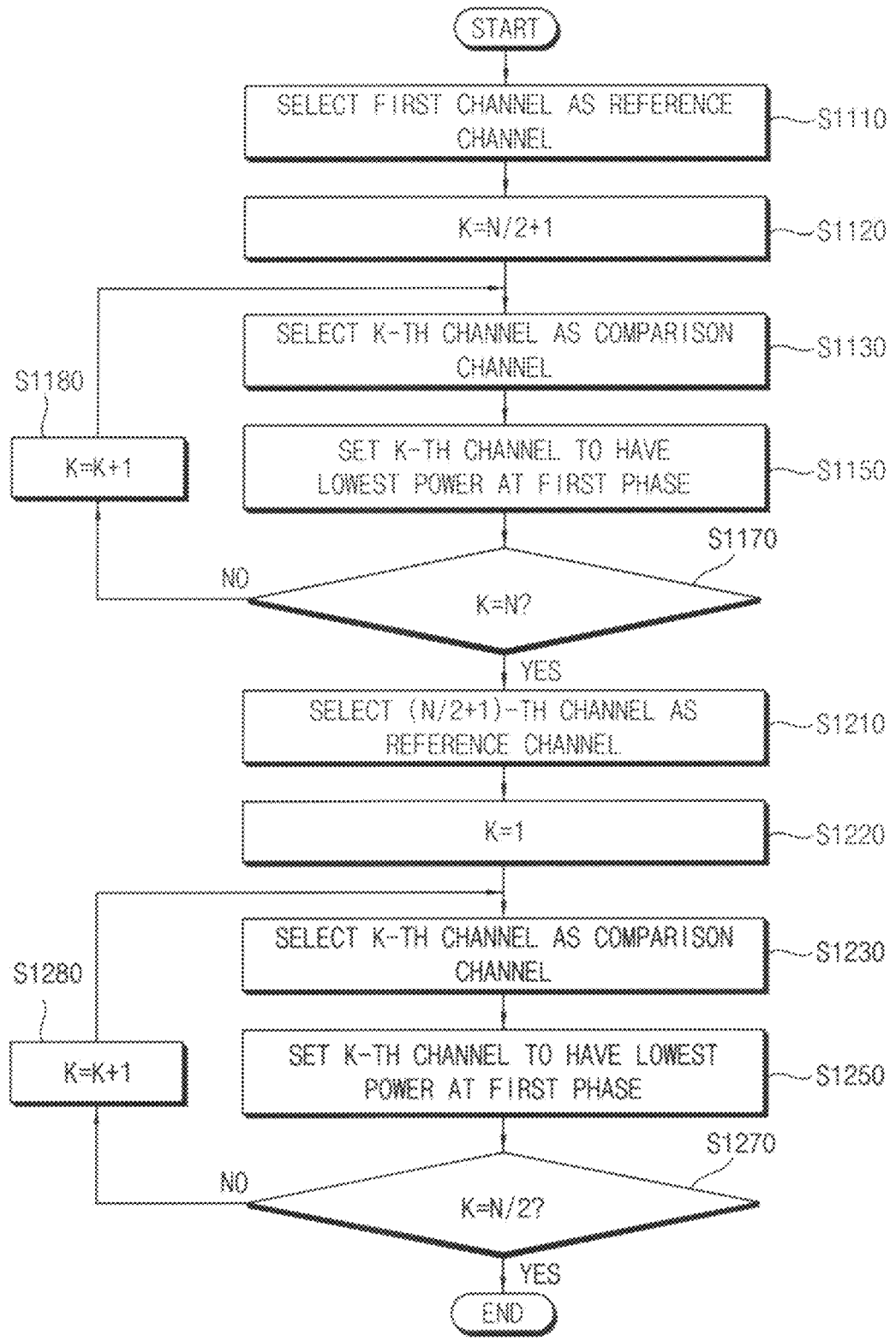
FIG. 10 is a flowchart illustrating a channel calibration method according to example embodiments.

FIG. 10 is a flowchart illustrating a channel calibration method according to example embodiments. The channel calibration method of FIG. 10 will be described based on the multi-channel beamforming system 200 of FIG. 9 and the calibration circuit included therein. The descriptions repeated with FIG. 3 will be omitted.

Referring to FIGS. 9 and 10, in a channel calibration method using the calibration circuit included in the multi-channel beamforming system 200 according to example embodiments, the plurality of channels 1100-1 to 1100-8 may be divided into a first channel group including the channels 1100-1 to 1100-4 and a second channel group including the channels 1100-5 to 1100-8, and a calibration operation may be performed for each channel group.

First, the first channel 1100-1 is selected as a reference channel (step S1110), the channels 1100-5 to 1100-8 included in the second channel group are sequentially selected as a comparison channel, and the fifth to eighth channels 1100-5 to 1100-8 are sequentially set to have the lowest power at the first phase.

For example, K may be set to N/2+1 (step S1120), a K-th channel (e.g., the fifth channel 1100-5) may be selected as the comparison channel (step S1130), and the K-th channel may be set to have the lowest power at the first phase (step S1150). When both steps S1130 and S1150 are not performed for until the last channel (e.g., the eighth channel 1100-8) in the second channel group (step S1170: NO), K may be increased by one (step S1180), and steps S1130 and S1150 may be repeated. Based on such repetitions, the channels 1100-5 to 1100-8 included in the second channel group may be calibrated to have optimal phase/gain states at the same phase.

Steps S1110, S1120, S1130, S1150, S1170 and S1180 may be similar to steps S110, S120, S130, S150, S170 and S180 in FIG. 3, respectively.

Next, the fifth channel 1100-5 is selected as the reference channel (step S1210), the channels 1100-1 to 1100-4 included in the first channel group are sequentially selected as the comparison channel, and the first to fourth channels 1100-1 to 1100-4 are sequentially set to have the lowest power at the first phase.

For example, K may be set to one (step S1220), the K-th channel (e.g., the first channel 1100-1) may be selected as the comparison channel (step S1230), and the K-th channel may be set to have the lowest power at the first phase (step S1250). When both steps S1230 and S1250 are not performed for until the last channel (e.g., the fourth channel 1100-4) in the first channel group (step S1270: NO), K may be increased by one (step S1280), and steps S1230 and S1250 may be repeated. Based on such repetitions, the channels 1100-1 to 1100-4 included in the first channel group may be calibrated to have optimal phase/gain states at the same phase.

Steps S1210, S1220, S1230, S1250, S1270 and S1280 may be similar to steps S1110, S1120, S1130, S1150, S1170 and S1180, respectively.

FIGS. 11A, 11B, 11C and 11D are diagrams for describing an operation of FIG. 10.

Figure 11A:
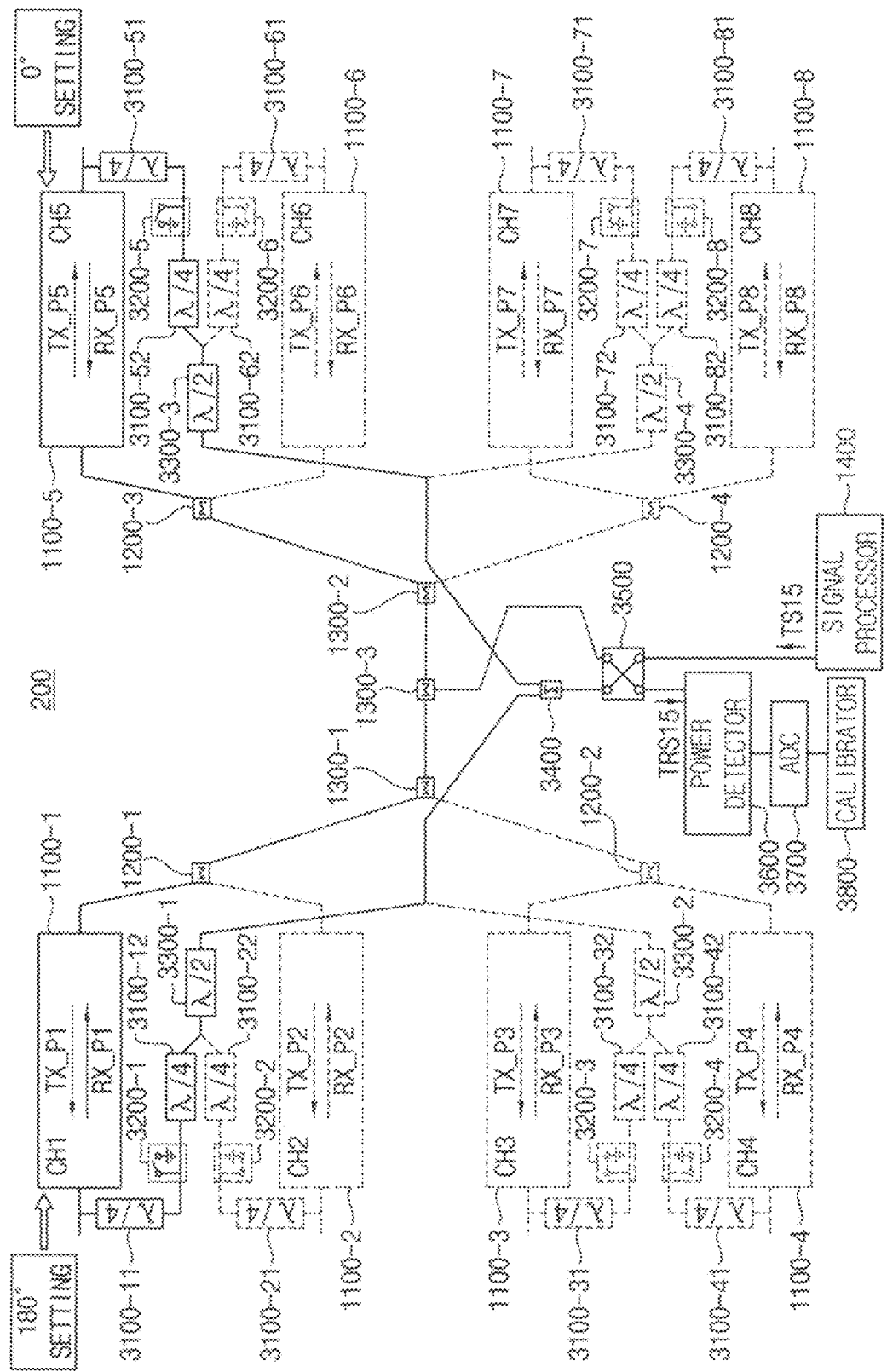
FIGS. 11A, 11B, 11C and 11D are diagrams for describing an operation of FIG. 10.
Figure 11B:
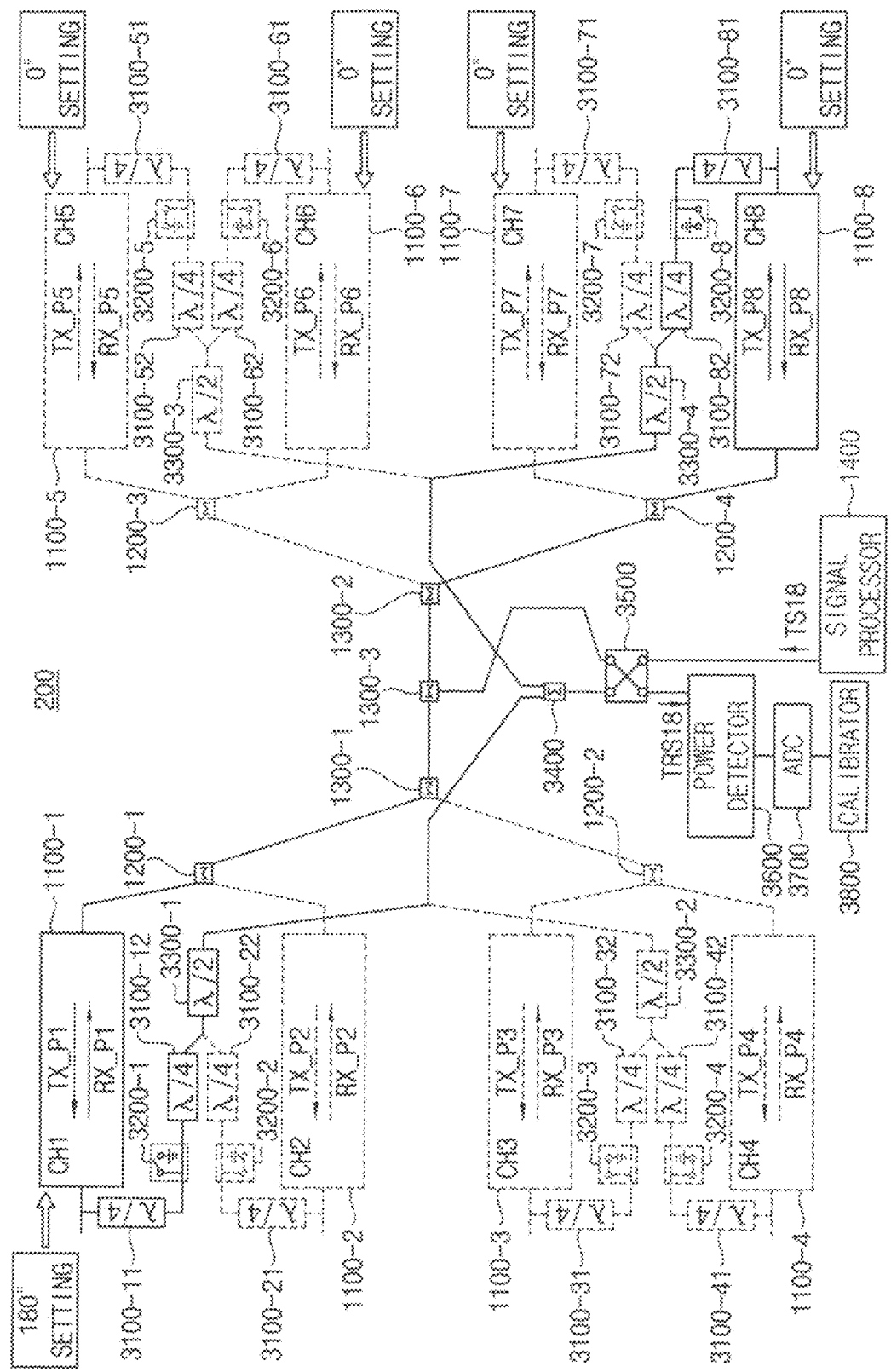

First, referring to FIGS. 11A and 11B, an example where steps S1110, S1120, S1130, S1150, S1170 and S1180 in FIG. 10 are performed is illustrated.

For example, as illustrated in FIG. 11A, the calibration circuit may enable only the first and fifth channels 1100-1 and 1100-5 and signal paths related thereto, may set the first channel 1100-1 to about 180 degrees, and may set the fifth channel 1100-5 to about 0 degree by performing the process described with reference to FIGS. 4 and 5. To set the fifth channel 1100-5, a test signal TS15 and a test result signal TRS15 may be used.

Similarly, each of the sixth and seventh channels 1100-6 to 1100-7 may be set to about 0 degree.

Lastly, as illustrated in FIG. 11B, the calibration circuit may enable only the first and eighth channels 1100-1 and 1100-8 and signal paths related thereto, and may set the eighth channel 1100-8 to about 0 degrees by performing the process described with reference to FIGS. 4 and 5. To set the eighth channel 1100-8, a test signal TS18 and a test result signal TRS18 may be used.

Figure 11C:
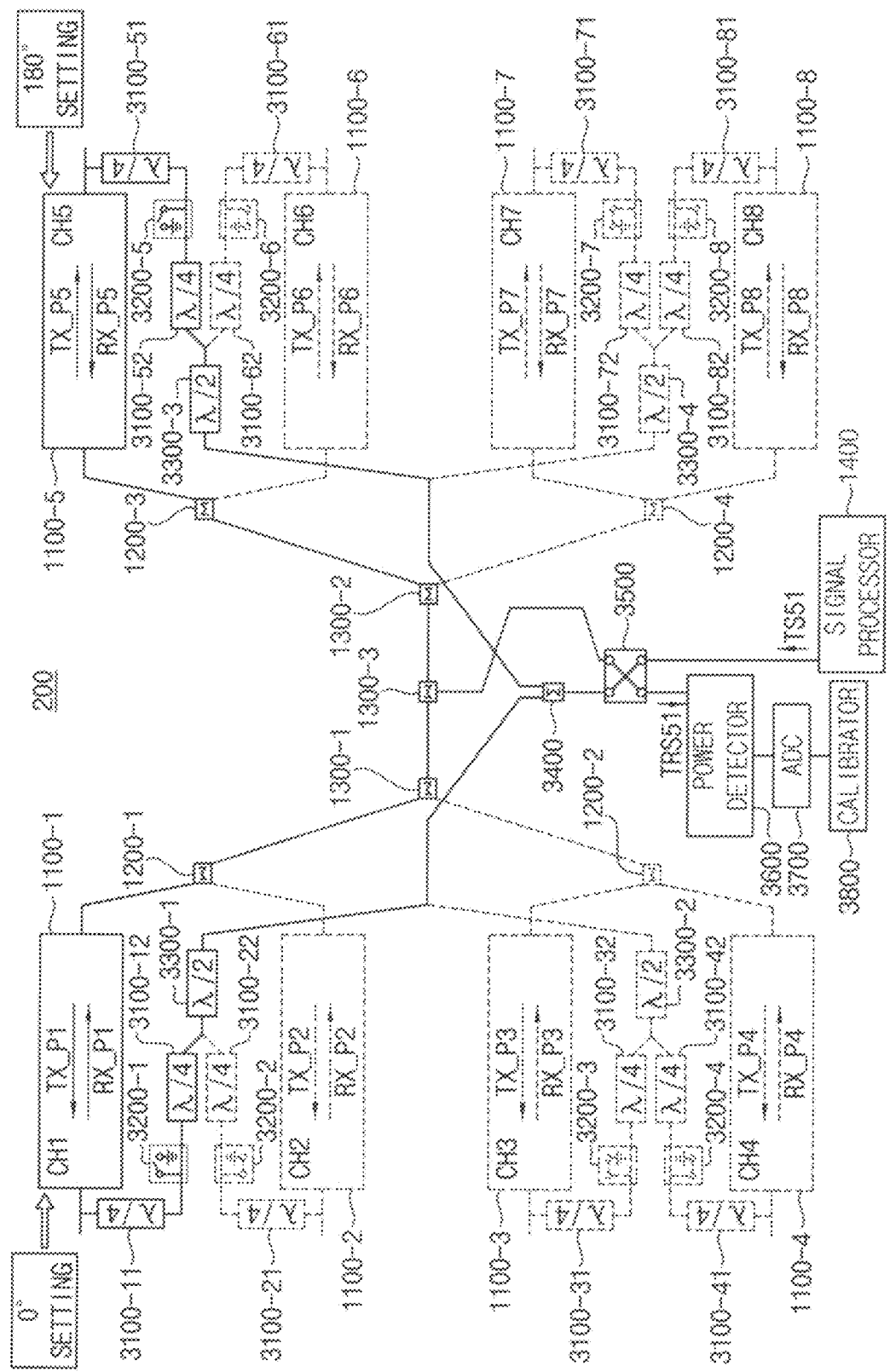
Figure 11D:
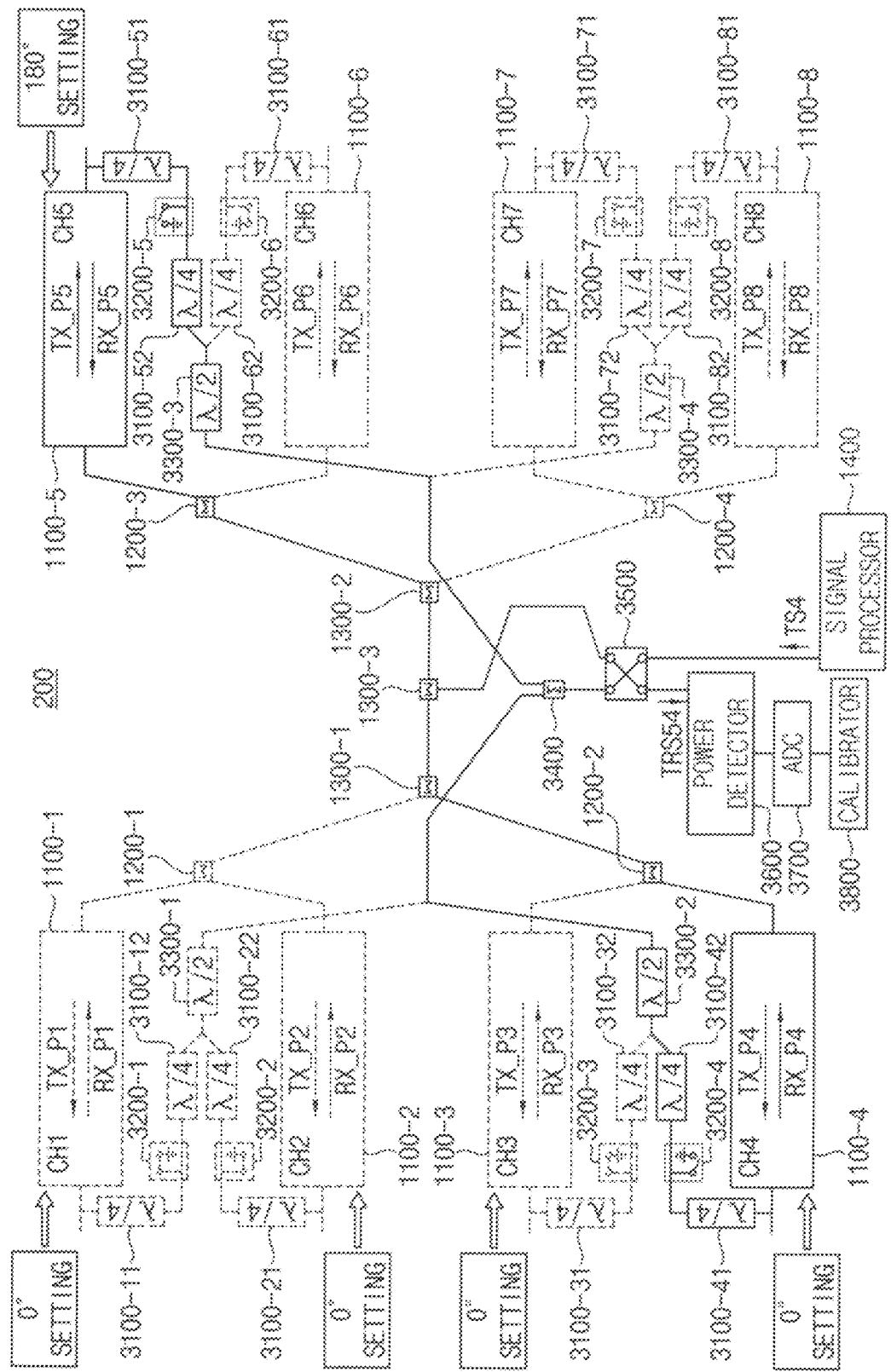

Next, referring to FIGS. 11C and 11D, an example where steps S1210, S1220, S1230, S1250, S1270 and S1280 in FIG. 10 are performed is illustrated.

For example, as illustrated in FIG. 11C, the calibration circuit may enable only the first and fifth channels 1100-1 and 1100-5 and signal paths related thereto, may set the fifth channel 1100-5 to about 180 degrees, and may set the first channel 1100-1 to about 0 degree by performing the process described with reference to FIGS. 4 and 5. For example, using the variable gain phase shifter included in the fifth channel 1100-5, the fifth channel 1100-5 may be set to about 180 degrees by rotating the phase of the fifth channel 1100-5 from about 0 degree set by the operation of FIG. 11A to about 180 degrees. To set the first channel 1100-1, a test signal TS51 and a test result signal TRS51 may be used.

Similarly, each of the second and third channels 1100-2 to 1100-3 may be set to about 0 degree.

Lastly, as illustrated in FIG. 11D, the calibration circuit may enable only the fourth and fifth channels 1100-4 and 1100-5 and signal paths related thereto, and may set the fourth channel 1100-4 to about 0 degree by performing the process described with reference to FIGS. 4 and 5. To set the fourth channel 1100-4, a test signal TS54 and a test result signal TRS54 may be used.

Figure 12:
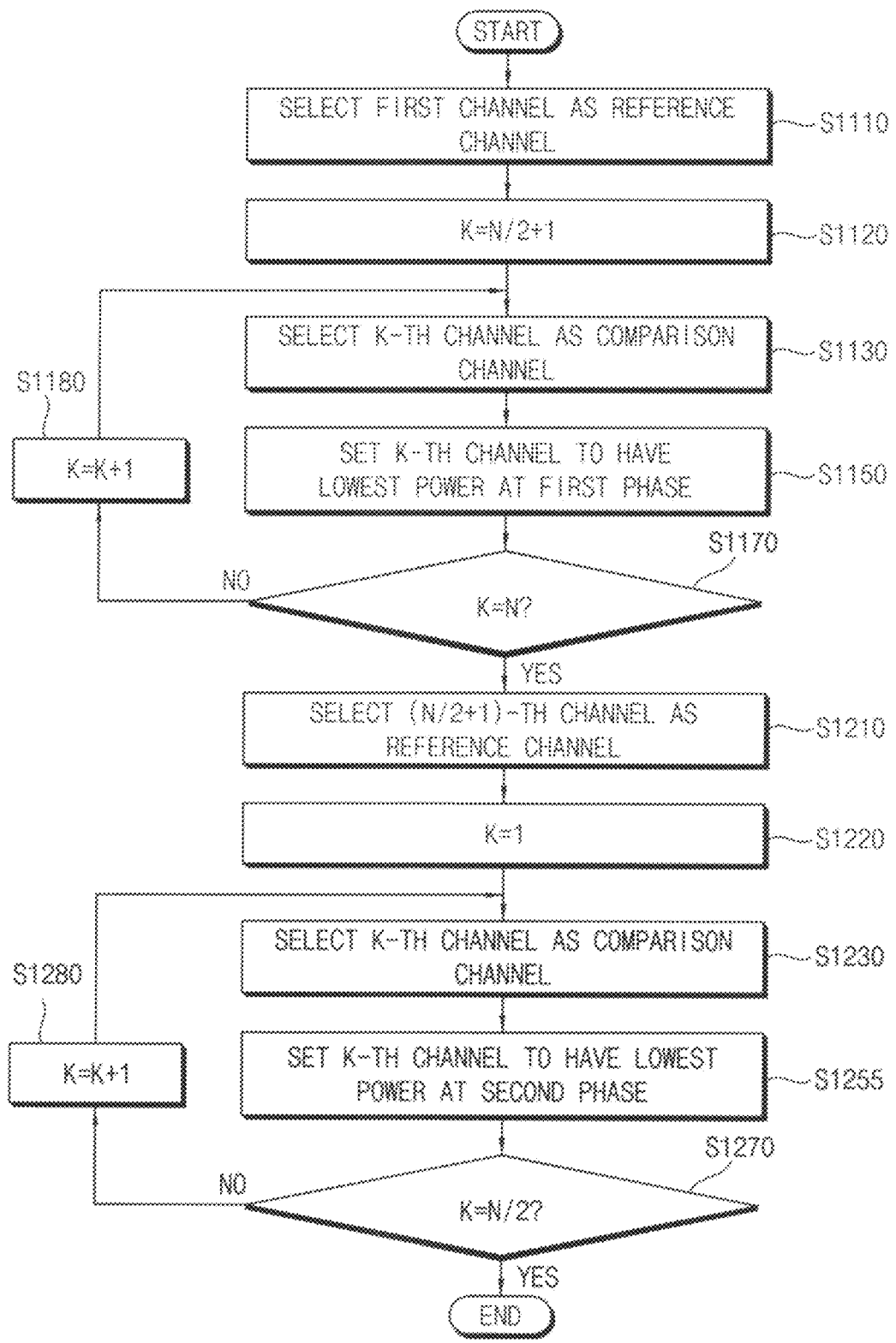
FIG. 12 is a flowchart illustrating a channel calibration method according to example embodiments.

FIG. 12 is a flowchart illustrating a channel calibration method according to example embodiments. The channel calibration method of FIG. 12 will be described based on the multi-channel beamforming system 200 of FIG. 9 and the calibration circuit included therein. The descriptions repeated with FIGS. 3 and 10 will be omitted.

Referring to FIGS. 9 and 12, in a channel calibration method using the calibration circuit included in the multi-channel beamforming system 200 according to example embodiments, the method of FIG. 12 may be substantially the same as the method of FIG. 10, except that step S1255 is changed. Steps S1110, S1120, S1130, S1150, S1170, S1180, S1210, S1220, S1230, S1270 and S1280 may be substantially the same as steps S1110, S1120, S1130, S1150, S1170, S1180, S1210, S1220, S1230, S1270 and S1280 in FIG. 10, respectively.

In the method of FIG. 12, the K-th channel may be set to have the lowest power at the second phase (step S1255). Step S1255 may be similar to step S250 in FIG. 3.

Figure 13A:
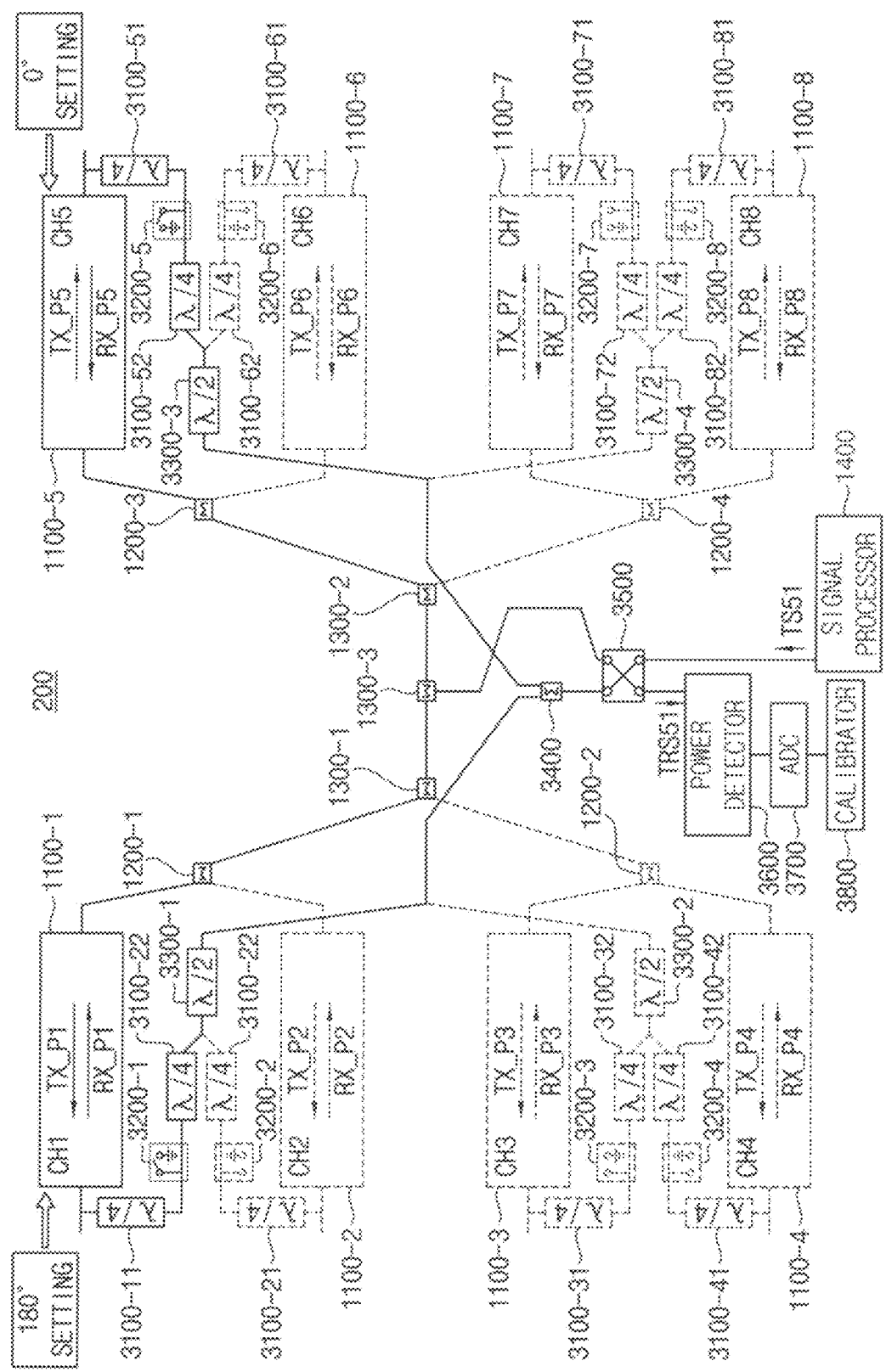
FIGS. 13A and 13B are diagrams for describing an operation of FIG. 12.
Figure 13B:
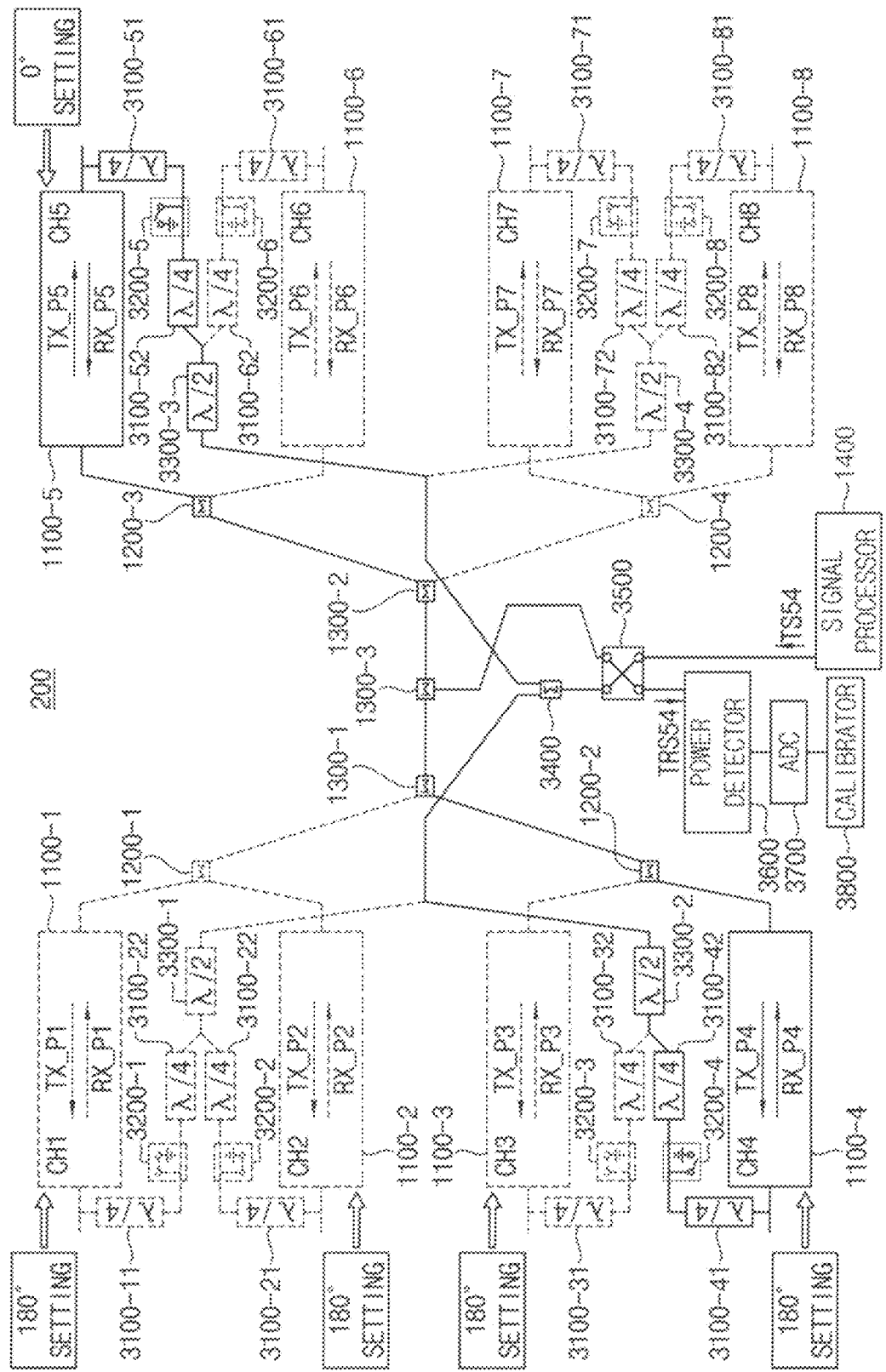

FIGS. 13A and 13B are diagrams for describing an operation of FIG. 12.

Referring to FIGS. 13A and 13B, an example where steps S1210, S1220, S1230, S1255, S1270 and S1280 in FIG. 12 are performed is illustrated.

For example, the calibration circuit may enable only the first and fifth channels 1100-1 and 1100-5 and signal paths related thereto, may set the fifth channel 1100-5 to about 0 degree, and may set the first channel 1100-1 to about 180 degrees by performing the process described with reference to FIG. 6. Unlike the example of FIG. 11C, the operation of rotating the phase of the fifth channel 1100-5 may be unnecessary.

Similarly, each of the second and third channels 1100-2 to 1100-3 may be set to about 180 degrees.

Lastly, as illustrated in FIG. 13B, the calibration circuit may enable only the fourth and fifth channels 1100-4 and 1100-5 and signal paths related thereto, and may set the fourth channel 1100-4 to about 180 degrees by performing the process described with reference to FIG. 6.

When the calibration operation is performed based on the method of FIG. 12, the channels 1100-5 to 1100-8 included in the second channel group may be calibrated to have the optimal phase/gain states at about 0 degree, and the channels 1100-1 to 1100-4 included in the first channel group may be calibrated to have the optimal phase/gain states at about 180 degrees. In other words, the channels 1100-1 to 1100-4 included in the first channel group and the channels 1100-5 to 1100-8 included in the second channel group may be set differently (e.g., may be set to have a difference of about 180 degrees). The offset generated within the chip may be calibrated even if the channels are set in this manner.

Although not illustrated in detail, the multi-channel beamforming system 100 of FIG. 1 may also perform the channel calibration methods of FIGS. 10 and 12.

Figure 14:
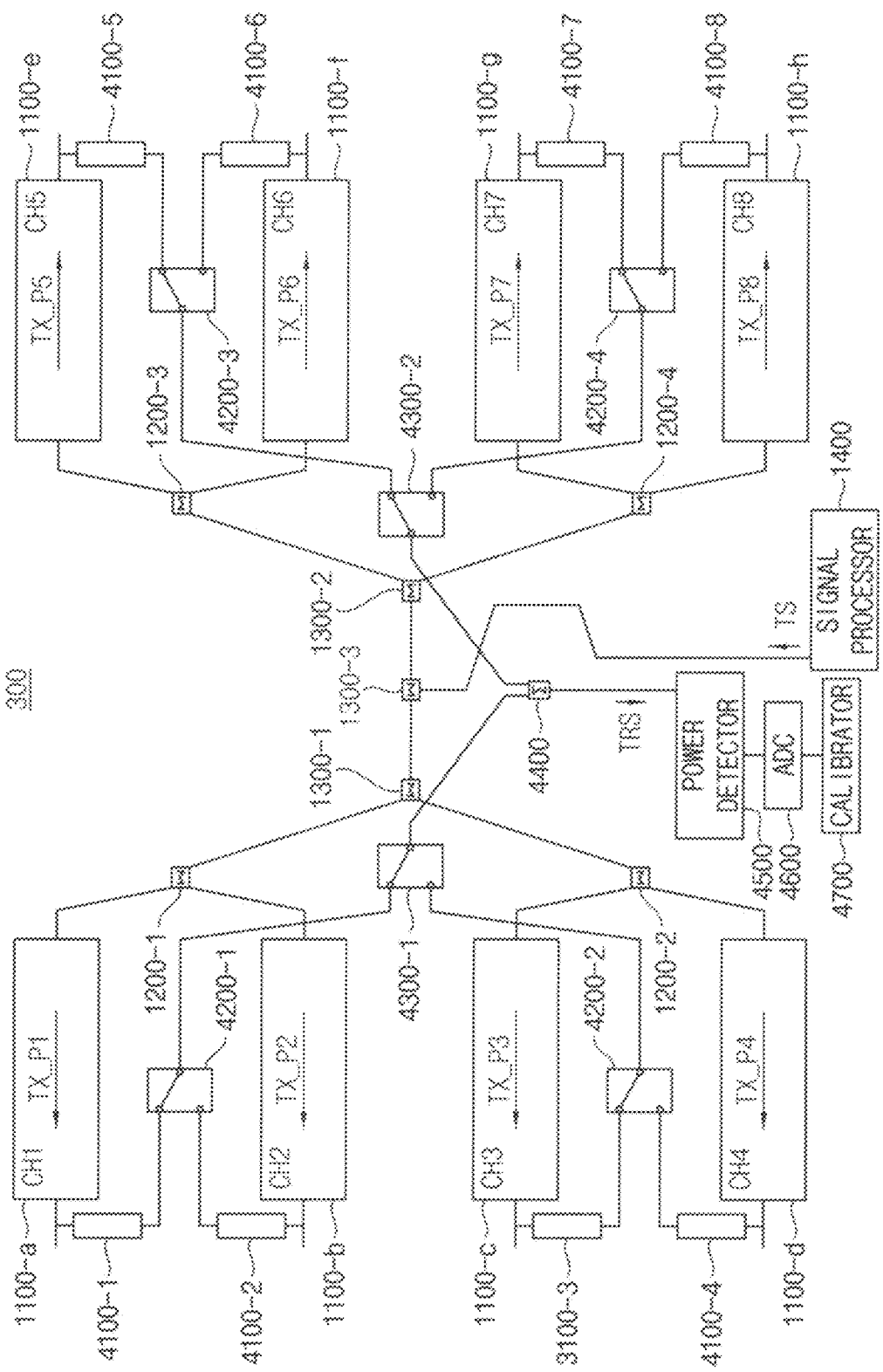
FIG. 14 is a block diagram illustrating a calibration circuit and a multi-channel beamforming system including the calibration circuit according to example embodiments.

FIG. 14 is a block diagram illustrating a calibration circuit and a multi-channel beamforming system including the calibration circuit according to example embodiments. The descriptions repeated with FIGS. 1 and 9 will be omitted.

Referring to FIG. 14, a multi-channel beamforming system 300 includes a plurality of channels 1100-a, 1100-b, 1100-c, 1100-d, 1100-e, 1100-f, 1100-g and 1100-h, and a calibration circuit. The multi-channel beamforming system 300 may further include a plurality of combiners/dividers 1200-1 to 1200-4 and 1300-1 to 1300-3, and a signal processor 1400.

The multi-channel beamforming system 300 of FIG. 14 may be substantially the same as the multi-channel beamforming system 100 of FIG. 1, except that configurations of the plurality of channels 1100-a to 1100-h and the calibration circuit are changed.

Unlike the plurality of channels 1100-1 to 1100-8 in FIG. 1, the plurality of channels 1100-a to 1100-h may include only the plurality of transmission paths TX_P1 to TX_P8. For example, in a case where the chip size is not important, such as a base station, or in a case such as a radar system, the transmission paths and the reception paths may be separated from each other to manufacture as two or more chips.

The calibration circuit includes a selection unit, a power detector 4500, an analog-to-digital converter 4600 and a calibrator 4700. The power detector 4500, the analog-to-digital converter 4600 and the calibrator 4700 may be substantially the same as the power detector 2500, the analog-to-digital converter 2600 and the calibrator 2700 in FIG. 1, respectively.

The selection unit may include a plurality of power couplers 4100-1, 4100-2, 4100-3, 4100-4, 4100-5, 4100-6, 4100-7 and 4100-8, a plurality of first channel selectors 4200-1, 4200-2, 4200-3 and 4200-4, a plurality of second channel selectors 4300-1 and 4300-2, and a combiner/divider 4400.

The plurality of power couplers 4100-1 to 4100-8 may be substantially the same as the plurality of power couplers 2100-1 to 2100-8 in FIG. 1, respectively.

The plurality of first channel selectors 4200-1 to 4200-4 may be connected to the plurality of power couplers 4100-1 to 4100-8. Each of the plurality of first channel selectors 4200-1 to 4200-4 may be connected to two adjacent power couplers. For example, the first channel selector 4200-1 may be directly connected to the power couplers 4100-1 and 4100-2.

The plurality of second channel selectors 4300-1 and 4300-2 may be connected to the plurality of first channel selectors 4200-1 to 4200-4. Each of the plurality of second channel selectors 4300-1 and 4300-2 may be connected to two adjacent channel selectors. For example, the second channel selector 4300-1 may be directly connected to the first channel selectors 4200-1 and 4200-2.

In some example embodiments, each of the plurality of first and second channel selectors 4200-1 to 4200-4, 4300-1 and 4300-2 may include a single-pole double-throw (SPDT) switch or a single-pole triple-throw (SP3T) switch. The SPDT switch may serve to pass only one of two input signals, and the SP3T switch may serve to pass only one of two input signals and may further serve to block both input signals.

The combiner/divider 4400 may be connected to the plurality of second channel selectors 4300-1 and 4300-2, and may be similar to the combiner/divider 3400 in FIG. 9.

Unlike the multi-channel beamforming systems 100 and 200 of FIGS. 1 and 9, the plurality of channels 1100-a to 1100-h included in the multi-channel beamforming system 300 of FIG. 14 may include only the plurality of transmission paths TX_P1 to TX_P8, and thus the transceiving channel selector in the selection unit included in the calibration circuit may be omitted or removed. As with the multi-channel beamforming system 200 of FIG. 9, in the multi-channel beamforming system 300 of FIG. 14, the channel calibration method of FIG. 3 cannot be performed, and the channel calibration methods of FIGS. 10 and 12 may be performed.

Although not illustrated in detail, when the plurality of channels 1100-1 to 1100-8 included in the multi-channel beamforming systems 100 and 200 of FIGS. 1 and 9 are implemented as the plurality of channels 1100-*a* to 1100-*h* in FIG. 14, the transceiving channel selectors 2400 and 3500 in FIGS. 1 and 9 may be omitted or removed.

Figure 15:
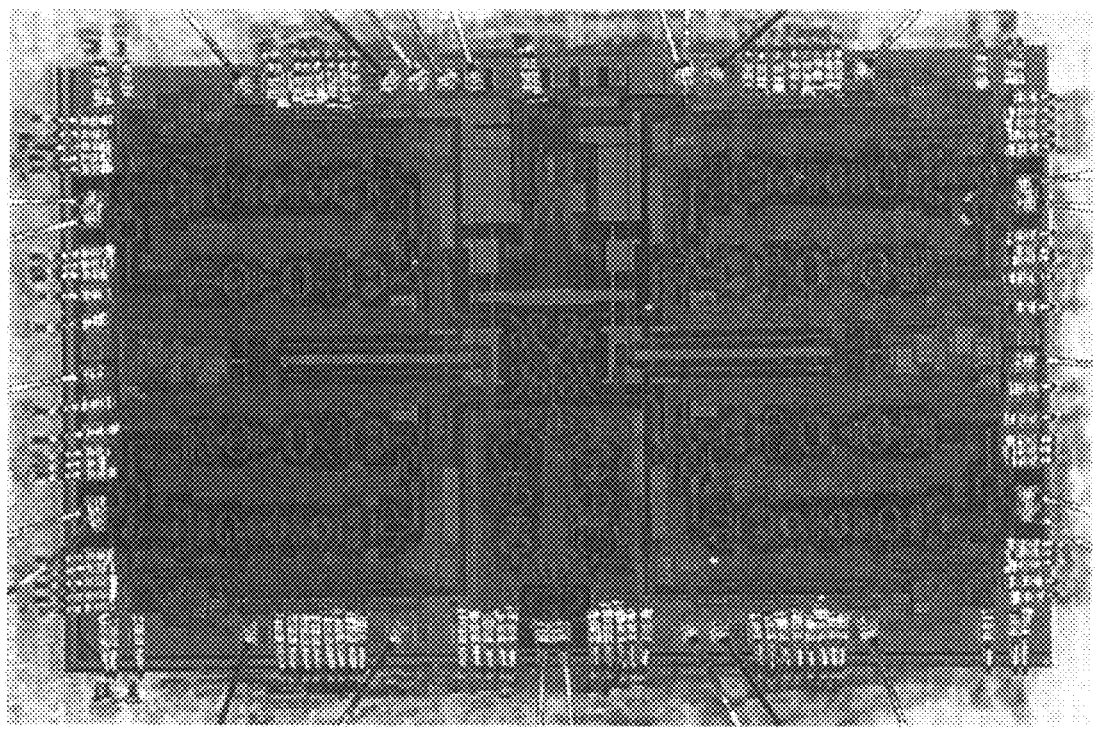
FIGS. 15, 16A and 16B are diagrams for describing a multi-channel beamforming system including a calibration circuit according to example embodiments.
Figure 16A:
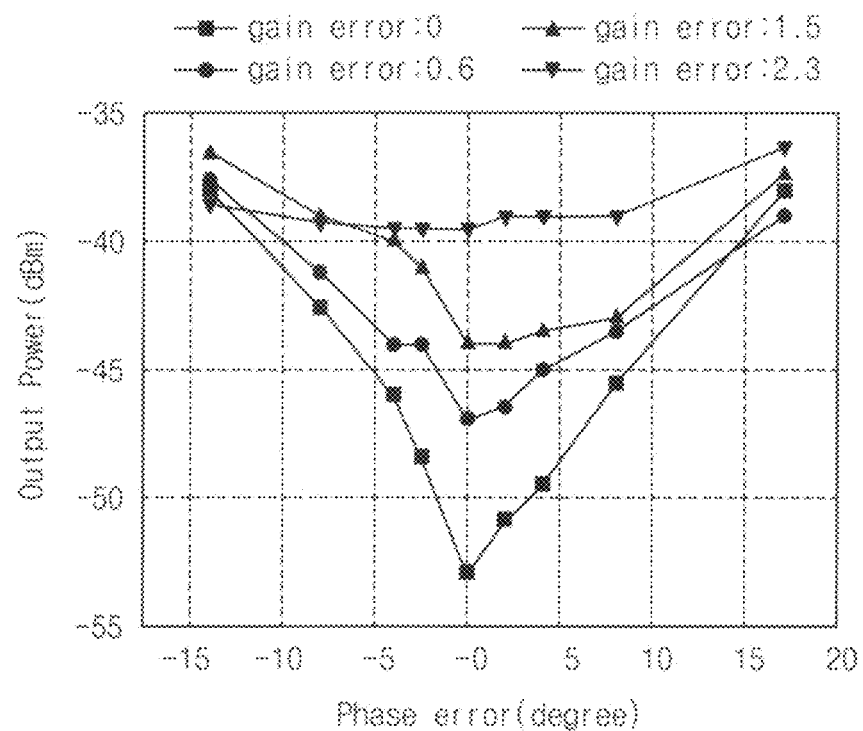
Figure 16B:
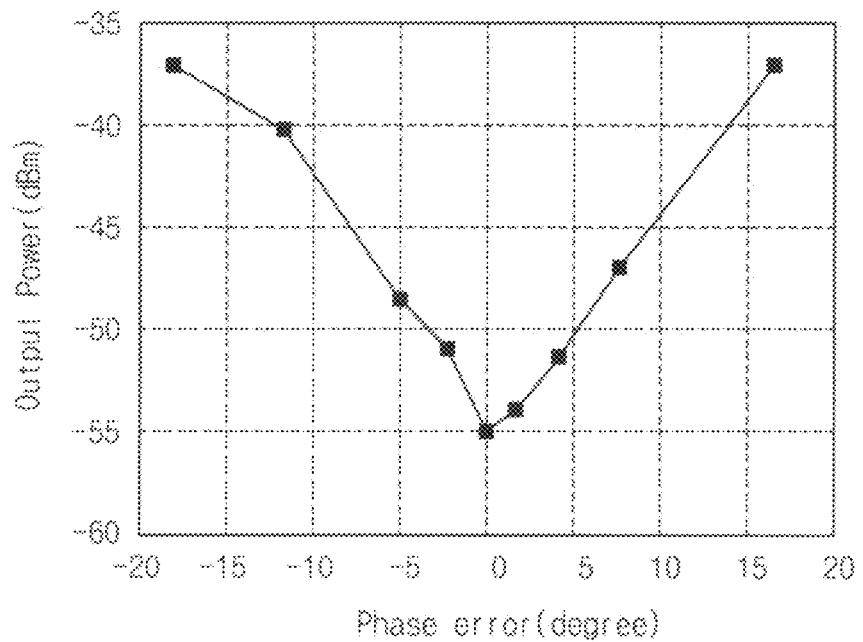

FIGS. 15, 16A and 16B are diagrams for describing a multi-channel beamforming system including a calibration circuit according to example embodiments.

Referring to FIG. 15, an implementation of a four-channel beamforming system with about 28 GHz in which a calibration circuit according to example embodiments is integrated is illustrated.

Referring to FIG. 16A, envelopes actually measured in the four-channel beamforming system of FIG. 15 are illustrated, and the envelopes are obtained based on a summed signal from third and fourth channels while a phase and a gain of the third channel are changed and a phase and a gain of the fourth channel are fixed. Referring to FIG. 16B, an envelope actually measured in the four-channel beamforming system of FIG. 15 is illustrated, and the envelope is obtained based on a summed signal from second and fourth channels while a phase and a gain of the second channel are changed and the phase and the gain of the fourth channel are fixed.

When there is no phase and gain errors in each channel (e.g., when there is a phase difference of about 180 degrees between two channels), it can be seen that the lowest power outputs. When each of the second and third channels are set based on the fourth channel and the phase and gain errors between two channels are measured, it can be seen that the errors are reduced from about 9 degrees and 1 dB errors before the calibration to about 1.2 degrees and 0.2 dB errors after the calibration. It can be seen that the calibration with high efficiency is performed using a relatively simple circuit, without the LO problems and the DC offset problems because the I/Q mixers are not used.

The phase and gain error calibration between channels is an essential technology for 5G communication systems and/or beyond 5G (B5G) communication systems, and also for radar systems and wireless power transmission systems, which are affected by an increase in sidelobes. A conventional technique has problems in that the LO is required, the DC offset problems of the I/Q mixers occur, and a complex feedback circuit is required to calibrate both the transmission and reception paths. The conventional technique is more complicated because the calibration is performed using absolute values of the phase and gain of each channel. In the calibration circuit and the channel calibration method according to example embodiments, the calibration may be performed by setting the reference value (or channel) in the chip and using relative values rather than the absolute values, and thus the complexity may be reduced. In addition, the I/Q mixers may not be used, and thus an LO signal may not be required and there may be no DC offset problems. Further, the structure may not be sensitive to frequency, and thus it may be easily applied to multi-band multi-channel chips and both the transmission and reception paths may be easily calibrated.

Figure 17:
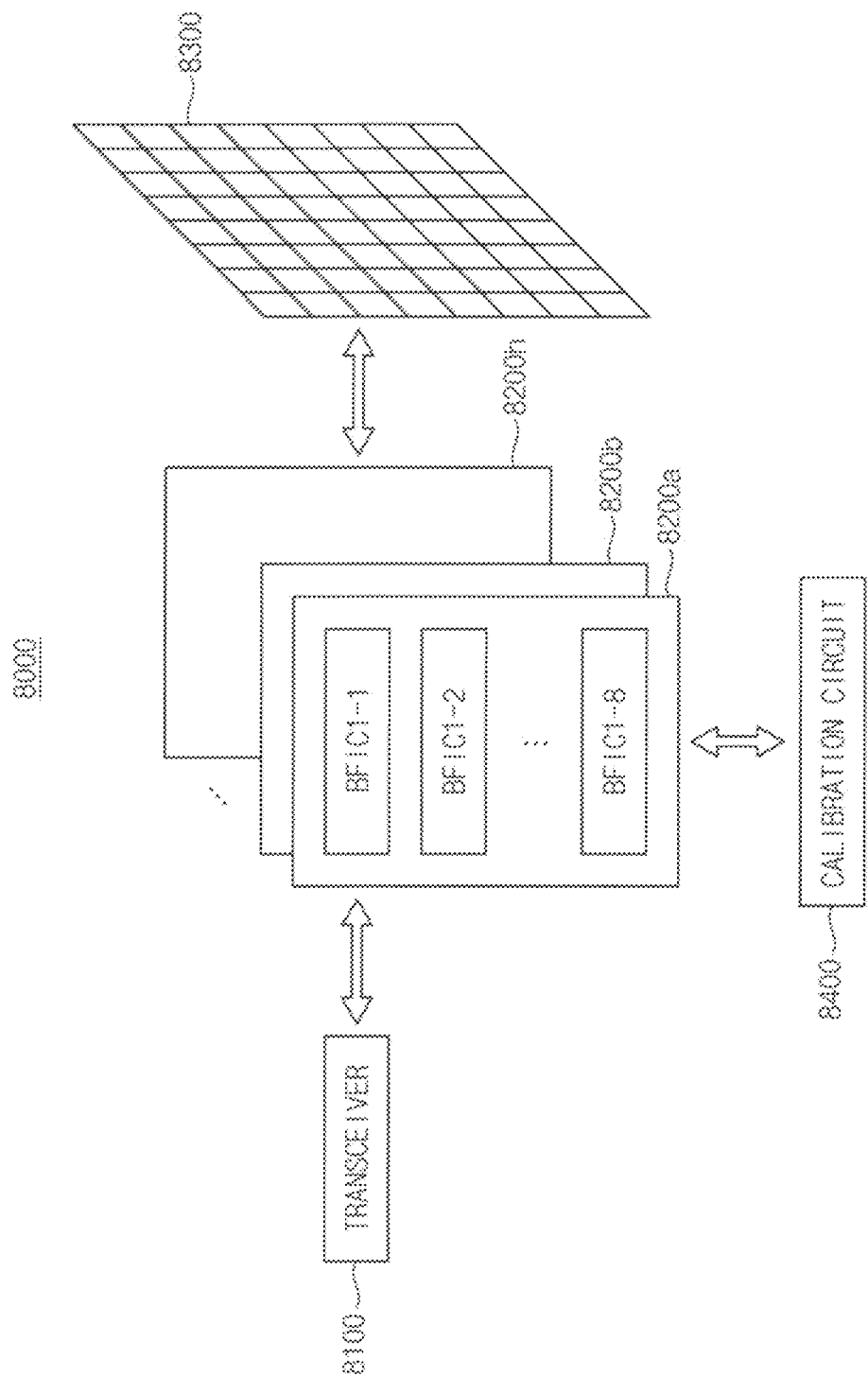
FIG. 17 is a block diagram illustrating a multi-channel beamforming system according to example embodiments.

FIG. 17 is a block diagram illustrating a multi-channel beamforming system according to example embodiments.

Referring to FIG. 17, a beamforming system 8000 includes a transceiver 8100, a plurality of beamforming circuit arrays 8200*a*, 8200*b*, . . . , 8200*h*, an antenna array 8300 and a calibration circuit 8400. Although FIG. 17 illustrates an 8*8 channel active phase array system, the number of elements or blocks included in the beamforming system may be variously determined according to example embodiments.

In the transmission mode, the transceiver 8100 performs operations such as encoding/decoding, encryption/decryption and/or modulation/demodulation on data to be transmitted to sequentially convert the data into baseband signals, intermediate frequency signals and RF signals, and provides the converted signals to the plurality of beamforming circuit arrays 8200*a* to 8200*h*. In the reception mode, the transceiver 8100 performs operations such as encoding/decoding, encryption/decryption and/or modulation/demodulation on RF signals received from the antenna array 8300 and the plurality of beamforming circuit arrays 8200*a* to 8200*h* to sequentially convert the RF signals into intermediate frequency signals, baseband signals and data.

The plurality of beamforming circuit arrays 8200*a* to 8200*h* include a plurality of beamforming circuits. For example, the beamforming circuit array 8200*a* may include first to eighth beamforming circuits BFIC1-1, BFIC1-2, BFIC1-8. Although not illustrated in detail, each of the beamforming circuit arrays 8200*b* to 8200*h* may also include a plurality of beamforming circuits.

The antenna array 8300 includes a plurality of antennas. Each antenna may be connected to a corresponding beamforming circuit to transmit/receive a signal.

One beamforming circuit included in the plurality of beamforming circuit arrays 8200*a* to 8200*h* and one antenna included in the antenna array 8300 may correspond to one channel described with reference to FIGS. 1 through 14.

The calibration circuit 8400 calibrates the phase and gain between channels, and may be the calibration circuit according to example embodiments described with reference to FIGS. 1 through 14.

The above-described embodiments may be applied to various communication devices and systems including the multi-channel beamforming systems, and various electronic devices and systems including the various communication devices and systems. For example, the example embodiments may be applied to devices or systems such as a mobile phone, a smart phone, a tablet computer, a laptop computer, a personal digital assistant (PDA), a portable multimedia player (PMP), a digital camera, a portable game console, a navigation device, a wearable device, an internet of things (IoT) device, an internet of everything (IoE) device, an e-book reader, a virtual reality (VR) device, an augmented reality (AR) device, a robotic device, or the like.

Particularly, the example embodiments may be applied to systems such as a 5G mobile communication system (e.g., about 28 GHz, 40 GHz, etc.), a military radar and communication system (e.g., X band, Ku band, W band, etc.), a satellite communication system (e.g., Ka band, etc.), an automotive radar (e.g., autonomous or self-driving vehicles) (e.g., about 79 GHz, etc.), a wireless power transmission (e.g., about 5.8 GHz, etc.), or the like.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A calibration circuit in a multi-channel beamforming system including a plurality of channels, the calibration circuit configured to calibrate phases and gains between the plurality of channels, the calibration circuit comprising:
    a selection unit connected to the plurality of channels, the selection unit configured to select two channels from among the plurality of channels, to provide a test signal to the selected two channels, and to receive a test result signal from the selected two channels;
    a power detector configured to detect power of the selected two channels based on the test result signal;
    an analog-to-digital converter configured to perform an analog-to-digital conversion on an output of the power detector; and
    a calibrator configured to calibrate the phases and the gains between the plurality of channels based on an output of the analog-to-digital converter,
    wherein one of the plurality of channels is set as a reference channel, phases and gains of remaining channels other than the reference channel among the plurality of channels are sequentially optimized based on the reference channel, and a phase and a gain of the reference channel is optimized based on one of the remaining channels.

2. The calibration circuit of claim 1, wherein:
    the plurality of channels include a first channel to an N-th channel, where N is a natural number greater than or equal to three,
    the first channel is selected as the reference channel, a second channel to the N-th channel are sequentially selected as a comparison channel, and the second channel to the N-th channel are sequentially set to have lowest power at a first phase,
    from among the second channel to the N-th channel, the second channel is selected as the reference channel and a third channel is selected as the comparison channel, and the third channel is set to have lowest power at a second phase different from the first phase, and
    the third channel is selected as the reference channel, the first channel is selected as the comparison channel, and the first channel is set to have lowest power at the first phase.

3. The calibration circuit of claim 2, wherein, in setting the second channel to have the lowest power at the first phase:
    while a phase and a gain of the first channel are set to the second phase and a first gain and a phase and a gain of the second channel are set to a third phase and the first gain, reference output power is measured based on the test result signal obtained from the first and second channels,
    after the phase and the gain of the second channel are adjusted while the phase and the gain of the first channel are maintained, comparison output power is measured based on the test result signal obtained from the first and second channels, and
    based on a result of comparing the reference output power with the comparison output power, the phase and the gain of the second channel are set to have smallest phase error and smallest gain error.

4. The calibration circuit of claim 2, wherein, in setting the third channel to have the lowest power at the second phase:
    while a phase and a gain of the second channel are set to the first phase and a first gain and a phase and a gain of the third channel are set to a third phase and the first gain, reference output power is measured based on the test result signal obtained from the second and third channels,
    after the phase and the gain of the third channel are adjusted while the phase and the gain of the second channel are maintained, comparison output power is measured based on the test result signal obtained from the second and third channels, and
    based on a result of comparing the reference output power with the comparison output power, the phase and the gain of the third channel are set to have smallest phase error and smallest gain error.

5. The calibration circuit of claim 1, wherein:
    the plurality of channels include a first channel to an N-th channel, where N is a natural number greater than or equal to three,
    the first channel is selected as the reference channel, an (N/2+1)-th channel to the N-th channel are sequentially selected as a comparison channel, and the (N/2+1)-th channel to the N-th channel are sequentially set to have lowest power at a first phase, and
    the (N/2+1)-th channel is selected as the reference channel, the first channel to an N/2-th channels are sequentially selected as the comparison channel, and the first channel to the N/2-th channel are sequentially set to have lowest power at the first phase.

6. The calibration circuit of claim 1, wherein:
    the plurality of channels include a first channel to an N-th channel, where N is a natural number greater than or equal to three,
    the first channel is selected as the reference channel, an (N/2+1)-th channel to the N-th channel are sequentially selected as a comparison channel, and the (N/2+1)-th channel to the N-th channel are sequentially set to have lowest power at a first phase, and
    the (N/2+1)-th channel is selected as the reference channel, the first channel to an N/2-th channels are sequentially selected as the comparison channel, and the first channel to the N/2-th channel are sequentially set to have lowest power at a second phase different from the first phase.

7. The calibration circuit of claim 1, wherein each of the plurality of channels includes:
    a transmission path configured to be enabled in a transmission mode to output a transmission signal; and
    a reception path configured to be enabled in a reception mode to receive a reception signal.

8. The calibration circuit of claim 7, wherein the selection unit includes:
    a plurality of power couplers connected to the plurality of channels;
    a plurality of first channel selection structures connected to the plurality of power couplers;
    at least one second channel selection structure connected to the plurality of first channel selection structures; and
    a transceiving channel selector connected to the second channel selection structure.

9. The calibration circuit of claim 8, wherein, in the transmission mode:
    the test signal is the transmission signal,
    the transceiving channel selector is configured to provide the transmission signal to the selected two channels, and
    the transceiving channel selector is configured to receive the test result signal from the selected two channels through the power couplers, the first channel selection structures and the second channel selection structure.

10. The calibration circuit of claim 8, wherein, in the reception mode:
the test signal is the reception signal,
the transceiving channel selector is configured to provide the reception signal to the selected two channels through the second channel select structure, the first channel select structures and the power couplers, and
the transceiving channel selector is configured to receive the test result signal from the selected two channels.

11. The calibration circuit of claim 7, wherein the selection unit includes:
a plurality of quarter-wavelength transformers connected to the plurality of channels;
a plurality of switches connected to the plurality of quarter-wavelength transformers;
a plurality of half-wavelength transformers connected to the plurality of quarter-wavelength transformers;
a combiner/divider connected to the plurality of half-wavelength transformers; and
a transceiving channel selector connected to the combiner/divider.

12. The calibration circuit of claim 1, wherein each of the plurality of channels includes only a transmission path configured to be enabled in a transmission mode to output a transmission signal.

13. The calibration circuit of claim 12, wherein the selection unit includes:
a plurality of power couplers connected to the plurality of channels;
a plurality of first channel selectors connected to the plurality of power couplers;
at least one second channel selector connected to the plurality of first channel selectors; and
a combiner/divider connected to the second channel selector.

14. A multi-channel beamforming system comprising:
a plurality of channels; and
a calibration circuit connected to the plurality of channels, the calibration circuit configured to calibrate phases and gains between the plurality of channels,
wherein the calibration circuit includes:
a selection unit connected to the plurality of channels, the selection unit configured to select two channels from among the plurality of channels, to provide a test signal to the selected two channels, and to receive a test result signal from the selected two channels;
a power detector configured to detect power of the selected two channels based on the test result signal;
an analog-to-digital converter configured to perform an analog-to-digital conversion on an output of the power detector; and
a calibrator configured to calibrate the phases and the gains between the plurality of channels based on an output of the analog-to-digital converter,
wherein one of the plurality of channels is set as a reference channel, phases and gains of remaining channels other than the reference channel among the plurality of channels are sequentially optimized based on the reference channel, and a phase and a gain of the reference channel is optimized based on one of the remaining channels.

15. A channel calibration method for calibrating phases and gains between a plurality of channels included in a multi-channel beamforming system, the plurality of channels including a first channel to an N-th channel, where N is a natural number greater than or equal to three, the channel calibration method comprising:
selecting the first channel as a reference channel;
sequentially selecting a second channel to the N-th channel as a comparison channel;
sequentially setting the second channel to the N-th channel to have lowest power at a first phase;
selecting the second channel as the reference channel;
selecting a third channel as the comparison channel;
setting the third channel to have lowest power at a second phase different from the first phase;
selecting the third channel as the reference channel;
selecting the first channel as the comparison channel; and
setting the first channel to have lowest power at the first phase.

16. The channel calibration method of claim 15, wherein sequentially setting the second channel to the N-th channel to have the lowest power at the first phase includes:
setting a phase and a gain of the first channel to the second phase and a first gain;
setting a phase and a gain of the second channel to a third phase and the first gain;
measuring reference output power based on a test result signal obtained from the first and second channels;
adjusting the phase and the gain of the second channel while the phase and the gain of the first channel are maintained;
measuring comparison output power based on the test result signal obtained from the first and second channels; and
based on a result of comparing the reference output power with the comparison output power, setting the phase and the gain of the second channel to have smallest phase error and smallest gain error.

17. The channel calibration method of claim 15, wherein setting the third channel to have the lowest power at the second phase includes:
setting a phase and a gain of the second channel to the first phase and a first gain;
setting a phase and a gain of the third channel to a third phase and the first gain;
measuring reference output power based on a test result signal obtained from the second and third channels;
adjusting the phase and the gain of the third channel while the phase and the gain of the second channel are maintained;
measuring comparison output power based on the test result signal obtained from the second and third channels; and
based on a result of comparing the reference output power with the comparison output power, setting the phase and the gain of the third channel to have smallest phase error and smallest gain error.

18. A channel calibration method for calibrating phases and gains between a plurality of channels included in a multi-channel beamforming system, the plurality of channels including a first channel to an N-th channel, where N is a natural number greater than or equal to three, the channel calibration method comprising:
selecting the first channel as a reference channel;
sequentially selecting an (N/2+1)-th channel to the N-th channel as a comparison channel;
sequentially setting the (N/2+1)-th channel to the N-th channel to have lowest power at a first phase;
selecting the (N/2+1)-th channel as the reference channel;
sequentially selecting the first channel to an N/2-th channel as the comparison channel; and sequentially setting the first channel to the N/2-th channel to have lowest power at the first phase or at a second phase different from the first phase.

* * * * *